United States Patent
Hamberg

(10) Patent No.: US 7,831,238 B2
(45) Date of Patent: Nov. 9, 2010

(54) METHOD AND SYSTEM FOR MULTIMEDIA TAGS

(75) Inventor: Max Hamberg, Vantaa (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/605,111

(22) Filed: Oct. 23, 2009

(65) Prior Publication Data

US 2010/0040232 A1 Feb. 18, 2010

Related U.S. Application Data

(63) Continuation of application No. 10/504,410, filed as application No. PCT/US03/02683 on Feb. 13, 2003, now Pat. No. 7,672,662, which is a continuation-in-part of application No. 10/073,200, filed on Feb. 13, 2002, now Pat. No. 7,340,214.

(51) Int. Cl.
H04K 1/00 (2006.01)
(52) U.S. Cl. .................................. 455/411; 455/466
(58) Field of Classification Search .............. 455/411, 455/414.2, 466
See application file for complete search history.

(56) References Cited

U.S. PATENT DOCUMENTS 7,185,362 B2 * 2/2007 Hawkes et al. ................. 726/4

* cited by examiner

*Primary Examiner*—Sam Bhattacharya
(74) *Attorney, Agent, or Firm*—Dittavong Mori & Steiner, P.C.

(57) ABSTRACT

A multimedia data construct called a tag (FIG. 5) may be stored and transferred. A user can use multimedia content, to create content portion of a tag (502). The multimedia file is then incorporated into the tag or it can be referenced by a pointer in the tag (530). The multimedia file is artistic expression of the user and the tag uniquely associates the user's identity with the multimedia file by prohibiting alteration of the content after the user completes its creation. The tag includes at least one dynamic indicator that may be changed based on one or more predefined rules upon transmission. The tag may include an ID, that may be based on subscriber information. Encryption techniques may be employed to protect privacy concerns so that such subscriber information is not freely available.

26 Claims, 33 Drawing Sheets

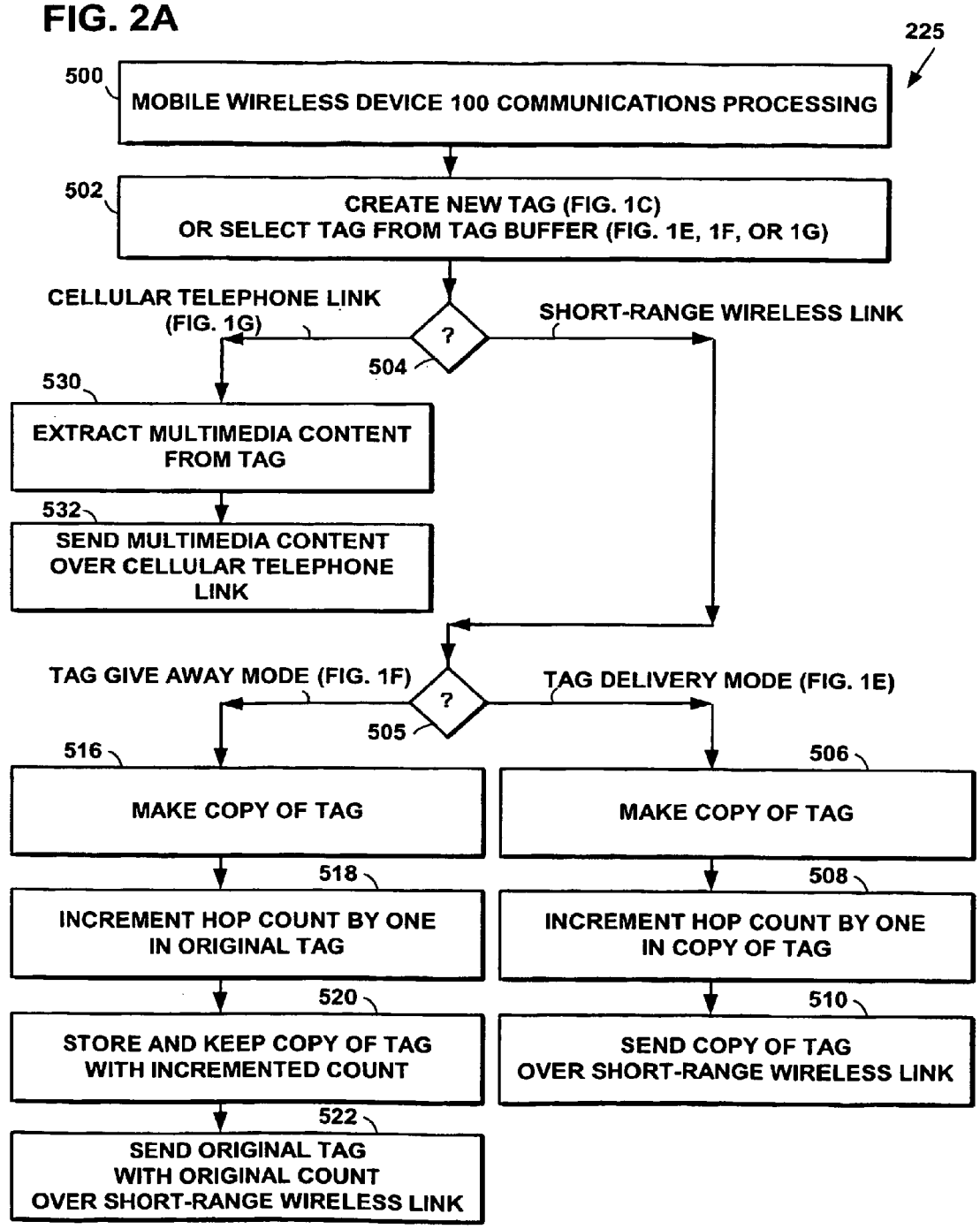

FIG. 5

"THE WALL" DATABASE STORAGE 156

DATABASE 158

| TAG INDEX | AUTHOR NAME | PERSONAL ID IMSI/MSISDN | HOP COUNT | CFG FLAG | PFG FLAG | MAC SIG. (MAC & DIGITAL SIGNATURE) | TIME STAMP | "THE WALL" COORDINATES X,Y | COMMENT CHAIN LINK |
|---|---|---|---|---|---|---|---|---|---|
| TAG 138 | USER 100 | +368102375 | HOP=1 | CFG =TRUE | PFG= FALSE | MAC SIG. | 26:01:02 | X138,Y138 | |
| TAG 134 | MONIQUE | +358402370 | HOP=1 | CFG =TRUE | PFG= FALSE | MAC SIG. | 18:12:01 | X134,Y134 | BAK_LINK TO TAG 132 |
| TAG 132 | MAX | +358432373 | HOP=1 | CFG =TRUE | PFG= FALSE | MAC SIG. | 04:12:01 | X132,Y132 | FOR_LINK TO TAG 134 |
| TAG 130 | TINA | +358332372 | HOP=1 | CFG =TRUE | PFG= FALSE | MAC SIG. | 03:12:01 | X130,Y130 | |
| TAG 128 | EIFFEL TOWER | --- | HOP=1 | CFG =TRUE | PFG= FALSE | MAC SIG. | 01:12:01 | X128,Y128 | |
| | | | | | | | | | |
| | | | | | | | | | |

METHOD AND SYSTEM FOR MULTIMEDIA TAGS

CROSS REFERENCE TO RELATED APPLICATIONS

This application is a continuation of U.S. application Ser. No. 10/504,410, filed Jan. 7, 2005, which is a National Stage of International Application No. PCT/2003/002683, filed Feb. 13, 2003, and a continuation-in-part of U.S. application Ser. No. 10/073,200, filed on Feb. 13, 2002, entitled "Short-Range Wireless System and Method for Multimedia Tags," which is incorporated herein by reference in its entirety.

FIELD OF THE INVENTION

The invention disclosed broadly relates to ubiquitous computing and more particularly relates to improvements in wireless technology.

BACKGROUND OF THE INVENTION

Short-Range Wireless Systems

Short-range wireless systems have a typical range of one hundred meters or less. They often combine with systems wired to the Internet to provide communication over long distances. The category of short-range wireless systems includes wireless personal area networks (PANs) and wireless local area networks (LANs). They have the common feature of operating in unlicensed portions of the radio spectrum, usually either in the 2.4 GHz Industrial, Scientific, and Medical (ISM) band or the 5 GHz Unlicensed-National Information Infrastructure (U-NII) band. Wireless personal area networks use low cost, low power wireless devices that have a typical range of ten meters. The best-known example of wireless personal area network technology is the Bluetooth Standard, which operates in the 2.4 GHz ISM band. It provides a peak air link speed of one Mbps and a power consumption low enough for use in personal, portable electronics such as PDAs and mobile phones. Wireless local area networks (LANs) generally operate at higher peak speeds of between 10 to 100 Mbps and have a longer range, which requires greater power consumption. Wireless local area networks are typically used as wireless links from portable laptop computers to a wired LAN, via an access point (AP). Examples of wireless local area network technology include the IEEE 802.11 Wireless LAN Standard and the HIPERLAN Standard, which operates in the 5 GHz U-NII band.

The Bluetooth Short-Range Wireless Technology

Bluetooth is a short-range radio network, originally intended as a cable replacement. It can be used to create networks of up to eight devices operating together. The Bluetooth Special Interest Group, *Specification of the Bluetooth System*, Volumes 1 and 2, Core and Profiles: Version 1.1, Feb. 22, 2001, describes the principles of Bluetooth device operation and communication protocols. The devices operate in the 2.4 GHz radio band reserved for general use by Industrial, Scientific, and Medical (ISM) applications. Bluetooth devices are designed to find other Bluetooth devices within their ten-meter radio communications range and to discover what services they offer, using a service discovery protocol (SDP).

The SDP searching function relies on links being established between the requesting Bluetooth device, such as a stationary access point device, and the responding Bluetooth device, such as a mobile user's device. When the mobile user's device enters within communicating range of the access point, its Link Controller layer in its transport protocol group handles the exchange of inquiry and paging packets to establish the initial link with the access point device. Then the Logical Link Control and Adaptation Protocol (L2CAP) layer in the transport protocol group passes the link status up to the layers in the middleware protocol group. The SDP searching function in the middleware protocol group can then be used to find out about application programs in the responding Bluetooth device that may provide desired services.

Bluetooth usage models are formally specified in application profiles set forth in the *Specification of the Bluetooth System*, referred to above. There are 13 application profiles described in Version 1.1 of the specification, including the Generic Access Profile (GAP), Service Discovery Profile (SDP), Generic Object Exchange Profile (GOEP), and Object Push Profile. The Generic Access Profile (GAP) defines how two Bluetooth units discover and establish a connection with each other. The service discovery protocol (SDP) defines the investigation of services available to a Bluetooth unit from other units. Generic Object Exchange Profile (GOEP) describes defines the set of protocols and procedures used by applications in handling object exchanges, e.g. File Transfer Synchronization using the Object Exchange (OBEX) Standard. The OBEX Standard is specified by the Infrared Data Association (IrDA), Object Exchange Protocol, Version 1.2. The OBEX Standard was adopted by Bluetooth as a session-oriented protocol, which allows multiple request/response exchanges in one session as a binary HTTP protocol. The Bluetooth Object Push Profile specification discusses the application of exchanging virtual business cards using the OBEX Standard.

The IEEE 802.11 Wireless LAN Standard

The IEEE 802.11 Wireless LAN Standard defines at least two different physical (PHY) specifications and one common medium access control (MAC) specification. The IEEE 802.11(a) Standard is designed for either the 2.4 GHz ISM band or the 5 GHz U-NII band, and uses orthogonal frequency division multiplexing (OFDM) to deliver up to 54 Mbps data rates. The IEEE 802.11(b) Standard is designed for the 2.4 GHz ISM band and uses direct sequence spread spectrum (DSSS) to deliver up to 11 Mbps data rates. The IEEE 802.11 Wireless LAN Standard describes two major components, the mobile station and the fixed access point (AP). IEEE 802.11 networks can be configured where the mobile stations communicate with a fixed access point. IEEE 802.11 also supports distributed activities similar those of the Bluetooth piconets. The IEEE 802.11 standard provides wireless devices with service inquiry features similar to the Bluetooth inquiry and scanning features.

In order for an IEEE 802.11 mobile station to communicate with other stations in a network, it must first find the stations. The process of finding another station is by inquiring. Active inquiry requires the inquiring station to transmit queries and invoke responses from other wireless stations in a network. In an active inquiry, the mobile station will transmit a probe request frame. If there is a network on the same channel that matches the service set identity (SSID) in the probe request frame, a station in that network will respond by sending a probe response frame to the inquiring station. The probe response includes the information necessary for the inquiring station to access a description of the network. The inquiring station will also process any other received probe response and Beacon frames. Once the inquiring station has processed any responses, or has decided there will be no responses, it may change to another channel and repeat the process. At the conclusion of the inquiry, the station has accumulated information about the networks in its vicinity. Once a station has performed an inquiry that results in one or more network descriptions, the station may choose to join one of the networks. The IEEE 802.11 Wireless LAN Standard is published in three parts as *IEEE* 802.11-1999; *IEEE* 802.11a-1999; and *IEEE* 802.11b-1999, which are available from the IEEE, Inc. web site http://grouper.ieee.org/groups/802/11.

High Performance Radio Local Area Network (HIPERLAN)

The HIPERLAN standard provides a wireless LAN with a high data rate of up to 54 Mbps and a medium-range of 50 meters. HIPERLAN wireless LANs provide multimedia distribution with video QoS, reserved spectrum, and good in-building propagation. There are two HIPERLAN standards. HIPERLAN Type 1 is a dynamic, priority driven channel access protocol similar to wireless Ethernet. HIPERLAN Type 2 is reserved channel access protocol similar to a wireless version of ATM. Both HIPERLAN Type 1 and HIPERLAN Type 2 use dedicated spectrum at 5 GHz. HIPERLAN Type 1 uses an advanced channel equalizer to deal with intersymbol interference and signal multipath. HIPERLAN Type 2 avoids these interference problems by using OFDM and a frequency transform function. The HIPERLAN Type 2 specification offers options for bit rates of 6, 16, 36, and 54 Mbps. The physical layer adopts an OFDM multiple carrier scheme using 48 carrier frequencies per OFDM symbol. Each carrier may then be modulated using BPSK, QPSK, 16-QAM, or 64-QAM to provide different data rates. The modulation schemes chosen for the higher bit rates achieve throughput in the range 30-50 Mbps.

The HIPERLAN Type 1 is a dynamic, priority driven channel access protocol that can form networks of wireless devices. HIPERLAN Type 1 networks support distributed activities similar those of the Bluetooth piconets and IEEE 802.11 independent basic service sets (IBSS). The HIPERLAN Type 1 standard provides wireless devices with service inquiry features similar to those of the Bluetooth inquiry and scanning features and the IEEE 802.11 probe request and response features. An overview of the HIPERLAN Type 1 principles of operation is provided in the publication *HIPERLAN Type 1 Standard*, ETSI ETS 300 652, WA2 December 1997.

HIPERLAN Type 2 is a reserved channel access protocol that forms networks. HIPERLAN Type 2 networks support distributed activities similar those of the HIPERLAN Type 1 networks, Bluetooth piconets and IEEE 802.11 independent basic service sets (IBSS). HIPERLAN Type 2 provides high-speed radio communication with typical data rates from 6 MHz to 54 Mbps. It connects portable devices with broad-band networks that are based on IP, ATM and other technologies. Centralized mode is used to operate HIPERLAN Type 2 as an access network via a fixed access point. A central controller (CC) in the fixed access point provides QoS coordinates the access of the mobile stations support. User mobility is supported within the local service area and wide area roaming mobility can also be supported. An overview of the HIPERLAN Type 2 principles of operation is provided in the Broadband Radio Access Networks (BRAN), *HIPERLAN Type 2; System Overview*, ETSI TR 101 683 VI.I.1 (2000-02) and a more detailed specification of its ad hoc network architecture is described in *HIPERLAN Type 2, Data Link Control (DLC) Layer; Part 4. Extension for Home Environment*, ETSI TS 101 761-4 V1.2.1 (2000-12).

SUMMARY OF THE INVENTION

A system and method is disclosed to store and transfer a new type of multimedia data construct called a tag. This system and method may be employed in wireless communications environments. A user can write text, create a voice clip and append it to the text, take a digital picture and append it to the text, to create a multimedia file as the content of a tag. The creation or modifying of the multimedia file can be done in the user's mobile wireless device or off line and then stored in the mobile device. The multimedia file is then incorporated into the tag or it can be referenced by a pointer in the tag. The multimedia file is artistic expression of the user and the tag uniquely associates the user's identity with the multimedia file by prohibiting alteration of the content after the user completes its creation. A content-originator flag (CFG) value in the tag is set to "false" during the period when the user is creating or modifying the tag's content. When the user completes editing the content of the tag, the content-originator flag (CFG) value is set to true, thereby freezing the content. The tag may include the user's ID, such as his/her international mobile subscriber identity (IMSI) or mobile station integrated services digital network number (MSISDN). Alternatively, the tag may include a tag ID that is derived from the user's ID. Subsequent viewers of the content can make a copy of the content and can then modify it, but they cannot authentically attribute the modified copy to the original user.

The invention can be implemented as a wireless personal area network (PAN) such as provided in Bluetooth Standard or a wireless local area network (LAN) such as provided in the IEEE 802.11 Wireless LAN Standard and the HIPERLAN Standard. This invention can also be implemented, for example, in other wireless communications environments, such as cellular telecommunications networks. In these environments, messaging services, such as the multimedia messaging service (MMS), may be used to transfer tags.

In one aspect of the invention, a server is connected to a short-range wireless access point, such as a Bluetooth access point. The access point is typically located at a frequent gathering place, such as a famous landmark, a shopping center, a school, or a home. Users carry Mobile Bluetooth devices, which are programmed in accordance with the invention to enable the users to create tags that contain multimedia messages. The messages are typically aphorisms, notes, jokes, and the like, which the users have previously prepared or spontaneously create. The tags are then uploaded over the Bluetooth link to the server for posting on a virtual "wall" for viewing by other users with Bluetooth viewing devices. The user has effectively "painted the wall" with his/her uploaded tag.

In further aspects of the invention, a server is connected to a interface that provides for the exchange of information across one or more wireless communications networks, such as cellular telecommunications networks. Users have communications devices, which are programmed to enable the users to create tags. The tags are then uploaded across the wireless communications network to the server for posting on a virtual "wall" for viewing by other users with tag viewing devices. The user has effectively "painted the wall" with his/her uploaded tag.

A user can browse tags that have previously been "painted on the wall", by viewing a list downloaded from the server, listing the tags stored in the server. The user can also perform a database search for tags using a query specifying particular IMSI or MSISDN values or user names. A list is then downloaded from the server, listing the tags stored in the server having the particular IMSI or MSISDN values or user names. The user may have old tags stored in his/her mobile device, and the IMSI or MSISDN values or user names can be extracted from those tags and used as the query sent to the server. A database in the server stores information about each tag in the server, in a tag record. Each tag record includes the information contained in the corresponding tag, to enable searches to be made on the author's name, IMSI or MSISDN identity, time that the tag was recorded, and the like. An additional field is included that links the tags forward or backward, if they are part of a sequence of user comments that have been recorded on "the wall". "The wall" server can be connected to a remote, backup server that stores a copy of all of the tags and the database, to be used in the event of disaster recovery. Additionally, the backup server can provide an accessible, bulk storage for old tags, to reduce the storage requirements on "the wall" server.

As an alternative to a user's ID, a tag may include a tag ID, which is derived from the user's ID. For example, the tag ID may be generated from the tag identifier with a public key and an asymmetric encryption algorithm, such as an RSA encryption algorithm. A corresponding private key that is maintained in secret is used to derive subscriber IDs from tagIDs. Accordingly, user privacy is protected by not "publicizing" subscriber IDs (e.g., MSISDNs and IMSIs) at locations, such as virtual walls.

Tags may include hop counts, but this is not required. When the original user has created the content in his/her mobile wireless device, a hop count value of zero is written into the tag. If the user uploads the tag to the server and writes the tag on "the wall", the hop count is incremented by one. Whenever a later user downloads a copy of the tag from the server, the hop count is incremented again by one. Alternatively, the hop count may be incremented when uploading, but not when downloading. Similarly, the hop count may be incremented when downloading, but not when uploading. Such techniques prevent a tag's hop count from being incremented by two when it is transferred between individuals via a wall.

When one user sends a copy of the tag to another user, each transmission increments the hop count in the tag by one. This feature makes original copies of the content more valuable, as signified by a low hop count value in the tag. A person-to-person flag (PFG) is also included in the tag. The initial value of the person-to-person flag (PFG) is set to a value of "true" when the originating user creates the tag. The person-to-person flag (PFG) value of "true" verifies that the tag has only been transferred from person-to-person, and has not been downloaded from "the wall" server. When the tag is uploaded to "the wall" server, the value of the person-to-person flag (PFG) is reset to a value of "false", and can never be returned to a value of "true". This resetting may be performed by either the person's device, or by the wall server. Thus, a tag directly received from a famous person will have a person-to-person hop count of one, and thus be an item of value, similar to an original, famous autograph. As long as the tag is not transferred to "the wall" server, the person-to-person flag (PFG) value remains "true" and the tag has a greater value than it would if it had been obtained by downloading it from "the wall" server.

One technique for freezing the content of the tag so that later viewers cannot attribute the modified content to the original user, is provided by public key encryption protocols, such as the secure sockets layer protocol. The originating party's device can compute a message authentication code (MAC) hash value on the content of the tag and then digitally sign the MAC using the originating party's secret key. Each receiving party's device decrypts the signed MAC using the originating party's public key and compares the recovered MAC with a reference MAC computed on the received content of the tag. If the two MAC values are equal, then the receiving party knows that the content has not been modified since it left the device of the originating party.

If the user has a Bluetooth equipped cellular telephone, he/she can transmit the multimedia content of a tag over a cellular telephone network to a cellular telephones capable of receiving multimedia files. However, in some embodiments, tags cannot be transmitted in any other manner than over a short-range wireless link, such as a Bluetooth link. In these embodiments, the user of a Bluetooth mobile device must be close enough to another Bluetooth device to directly communicate over the Bluetooth link in order to send a tag. As an example, the user must be at the location of the access point for the "wall" server in order to "paint the wall" with his/her tag. As a further example, the user must be at the location of his/her friend in order to deliver his/her tag to the friend. This requirement of proximity between sender and receiver of a tag may be imposed by the programmed operation of the Bluetooth devices, in accordance with embodiments of the invention.

There are two modes that the user can select from to transfer his/her tag to a friend. The first mode is a "tag delivery", whereby the sending user transfers a copy of the tag in the sender's device, causing the hop count to be incremented by one in the copy of the tag received by the recipient. The second mode is called "tag give-away", whereby the sending user transfers the tag currently in the sender's device, causing the hop count to remain unchanged in the tag received by the recipient. The sender effectively keeps a copy of the tag, and the copy in the sender's device is incremented by one.

In embodiments, messaging services, such as the multimedia messaging service (MMS) may be used to transfer tags. "Messaging tags" may be used that include a content portion and a header portion. The content portion is in a standard messaging format. The header portion includes the flags that are associated with tags, such as CFG, PFG, hop count, tag ID, or subscriber ID.

As set forth above, tags may include tag IDs as an alternative to user IDs. A communications device may obtain a tag ID for use in creating and transferring tags from a tag ID processing server. The tag ID processing server is within a trusted domain so that the services it provides can be trusted. For instance, when a user obtains a secured Tag ID, it can trust that it has been calculated correctly, and that no one outside the trusted domain can get the corresponding user ID because the user utilized a service within the trusted domain. Thus the trusted domain provides restrictions on accessibility and exhibits credibility.

The tag ID processing server receives a tag identifier configuration request (including a subscriber identifier) from a communications device; generates the tag identifier with an asymmetric encryption algorithm and a public key; and sends the tag identifier to the communications device. In addition, the tag ID processing server may ensure that the communications device is authorized to obtain the tag identifier. The tag identifier configuration request and the tag identifier may each be sent in short messaging service (SMS) messages. Alternatively, these may be sent in other formats, such as MMS messages, etc.

The tag ID processing server, in conjunction with a subscriber identification node, may also provide tag identity resolution services. These services allow communications devices to determine subscriber IDs (e.g., MSISDNs and IMSIs) from tag IDs. Accordingly, the tag ID processing server receives a tag identifier resolution request (including a tag identifier) from a communications device, generates a subscriber identifier from the tag identifier with an asymmetric encryption algorithm and a private key; and sends the subscriber identifier to the subscriber identification node. In response, the server receives subscriber-related information from the subscriber identification node; and sends the subscriber-related information to the communications device. In addition, the tag ID processing server may ensure that any communications device is authorized to obtain the subscriber-related information. This subscriber-related information may include, for example, a subscriber name. The tag identifier resolution request and the subscriber-related information may each be sent in short messaging service (SMS) messages.

In an alternate embodiment of the invention, the server is programmed to store the tags in association with two dimensional X,Y coordinates, in a tag storage in the server. A user can browse tags that have been posted on "the wall", by using up/down and left/right controls displayed in the GUI of the user's device.

In another alternate embodiment of the invention, payment may be required before a user is allowed to upload a tag to "paint the wall". If the user has a communications device, such as a Bluetooth equipped cellular telephone or other wireless device, he/she is required to send a short message service (SMS) charge-authorizing message over the cellular telephone system to an account-charging server, authorizing his/her account to be charged. The account-charging server returns an SMS payment token to the user's device over the cellular telephone system. The payment token must be received by the user's device before the user is allowed to upload a tag to "paint the wall". These payment tokens may also be implemented with premium rate MMS messages.

In another alternate embodiment of the invention, payment may be required before a user is allowed to download a tag from the "the wall" server. A digital rights management (DRM) authorization message is sent by the user's device over the Bluetooth link to "the wall" server. A DRM module in the server is connected over a network such as the Internet, to a DRM account-charging server. The DRM account charging server handles the necessary steps in debiting the user's account, and then returns an enabling signal to "the wall" server. "The wall" server then downloads over the Bluetooth link, the tag requested by the user. Such features may also be implemented in environments other than ones involving short-range wireless communications. Such features may be implemented with premium rate SMS and MMS messages.

In another alternate embodiment of the invention, payment may be required before a user is allowed to download a tag from the "the wall" server. A payment accumulator is included in the user's device, which accumulates authorized charges for downloading a plurality of tags from one or many "wall" servers over an extended period, such as a month. If the user has a communications device (e.g., a Bluetooth equipped cellular telephone), then at the end of the month, an SMS message containing the monthly total authorized charges is sent by the user's device over the cellular telephone system to an account charging server, authorizing his/her account to be charged. This feature may also be implemented with premium rate MMS messages.

In another alternate embodiment of the invention, payment may be required from a requesting user, before a providing user will transfer a tag to the requesting user. A digital rights management (DRM) module in each mobile wireless device handles the exchange of charge authorization messages over the Bluetooth link between the mobile devices. The DRM module in the requestor's device sends a charge-authorizing message to the provider's device. The provider's device then sends the tag requested by the requester, over the Bluetooth link. This feature may be implemented with SMS and MMS messages.

In another alternate embodiment of the invention, a tag can be automatically transferred from one Bluetooth device to another, whether stationary or mobile. The user's mobile Bluetooth device can be programmed to listen or scan for any Bluetooth access point device connected to a "wall" server. The SDP message exchange will tell the mobile device of the availability of "the wall" services. When the user's mobile device recognizes "a wall" within communications range, the user's mobile device uploads the user's tag and automatically "paints the wall". The user's mobile device can be programmed to automatically send a tag to any other Bluetooth device, including mobile devices. A "tag worm" can be created, wherein the tag automatically propagates from user device to user device, as users walk about. A user can prevent receiving unsolicited tags by turning off this feature. Such features may also be implemented in environments other than ones involving Bluetooth wireless communications.

In another alternate embodiment of the invention, a tag can be transferred from the user's mobile device to a "wall" server in the user's home, as a "personal or family tag storage". The personal home "wall" server is programmed to check the IMSI or MSISDN identity (or the secure tag ID) of the mobile device storing the tags, according to an embodiment of the present invention. The user can store and retrieve his/her tags from the personal home "wall" server without changing the hop counts in the tags. If an unauthorized person or device were to attempt retrieving the user's tags, the personal home "wall" server can prevent downloading the tags, or it can increment the hop counts in copies of the tags that are downloaded.

In another alternate embodiment of the invention, "the wall" server includes a queuing management system. In this embodiment, the short-range wireless access point for "the Wall" server is located within the premises of a business. "The wall" server performs the function of establishing a queue of customers waiting for service, such as in a bank or at a funfair or the like. The customer sends his/her Tag (including his/her presence/ID-information) to "the Wall" server. "The wall" server registers the customer as being on a virtual queuing line. When the customer uploads his/her tag to the server, the server can optionally return another tag that is an advertisement message of the business. After registering, the customer can optionally browse other tags from "the Wall" server while awaiting his/her turn within the premises of the business. Alternately, the customer can leave the premises of the business and when his/her turn is reached on the virtual queue, "the wall" server sends a notification message informing the customer that it is his/her turn at the front of the queue. The notification message can be delivered over a cellular telephone network as an SMS message. Alternately, the notification message can be transmitted over a LAN connected to "the wall" server, and delivered over a Bluetooth link to the customer's device by a Bluetooth access point connected to the LAN. Such features may also be implemented in environments other than ones involving short-range wireless communications.

server 150, using the tag author's name, IMSI or MSISDN identity, according to an embodiment of the present invention. A list of tags is viewed and the multimedia content of selected tags is viewed in the device's browser.

Figure 1:
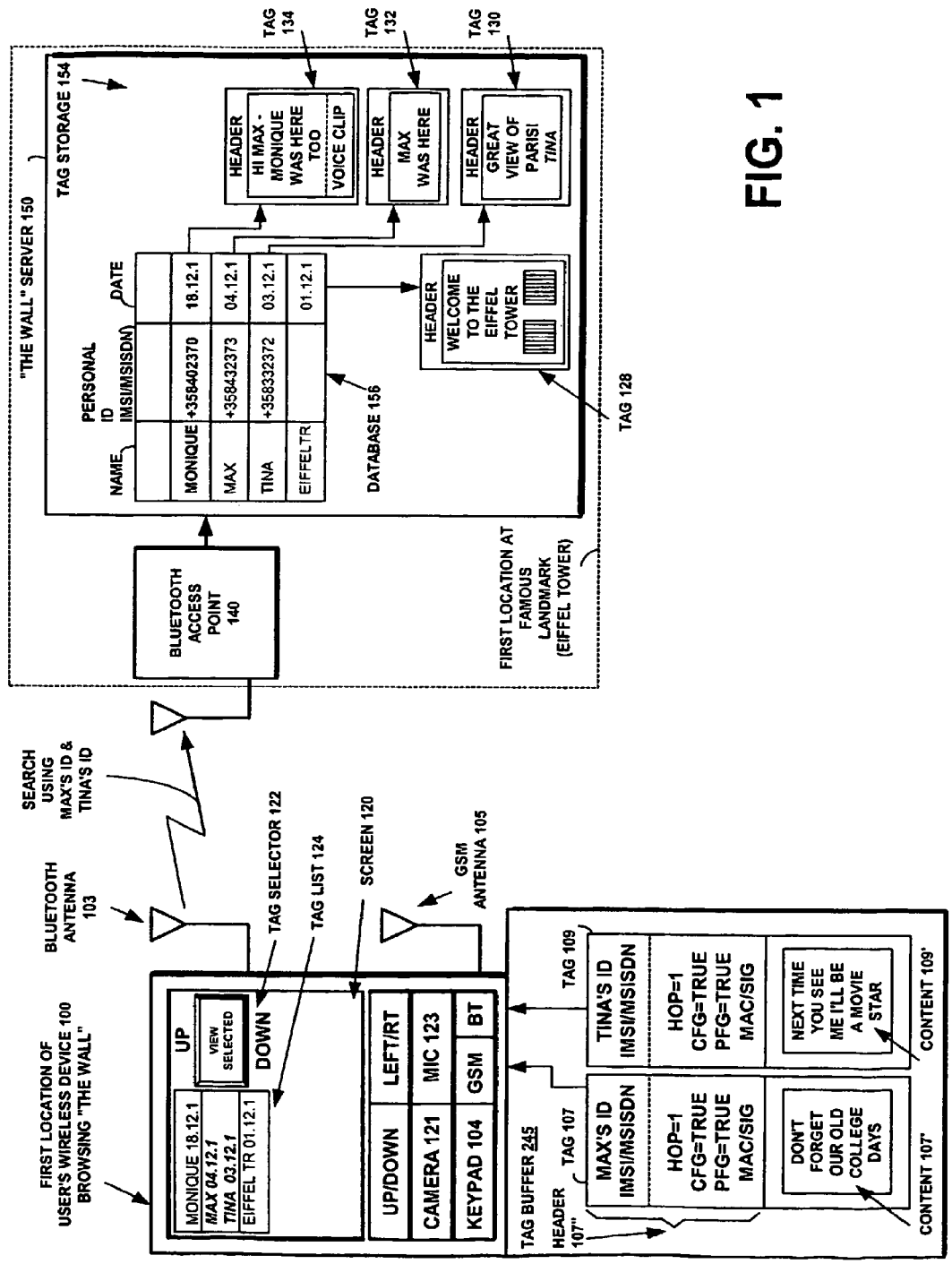
FIG. 1 illustrates a Bluetooth equipped cellular telephone 100 searching over the Bluetooth link for tags in "the wall"
Figure 1A:
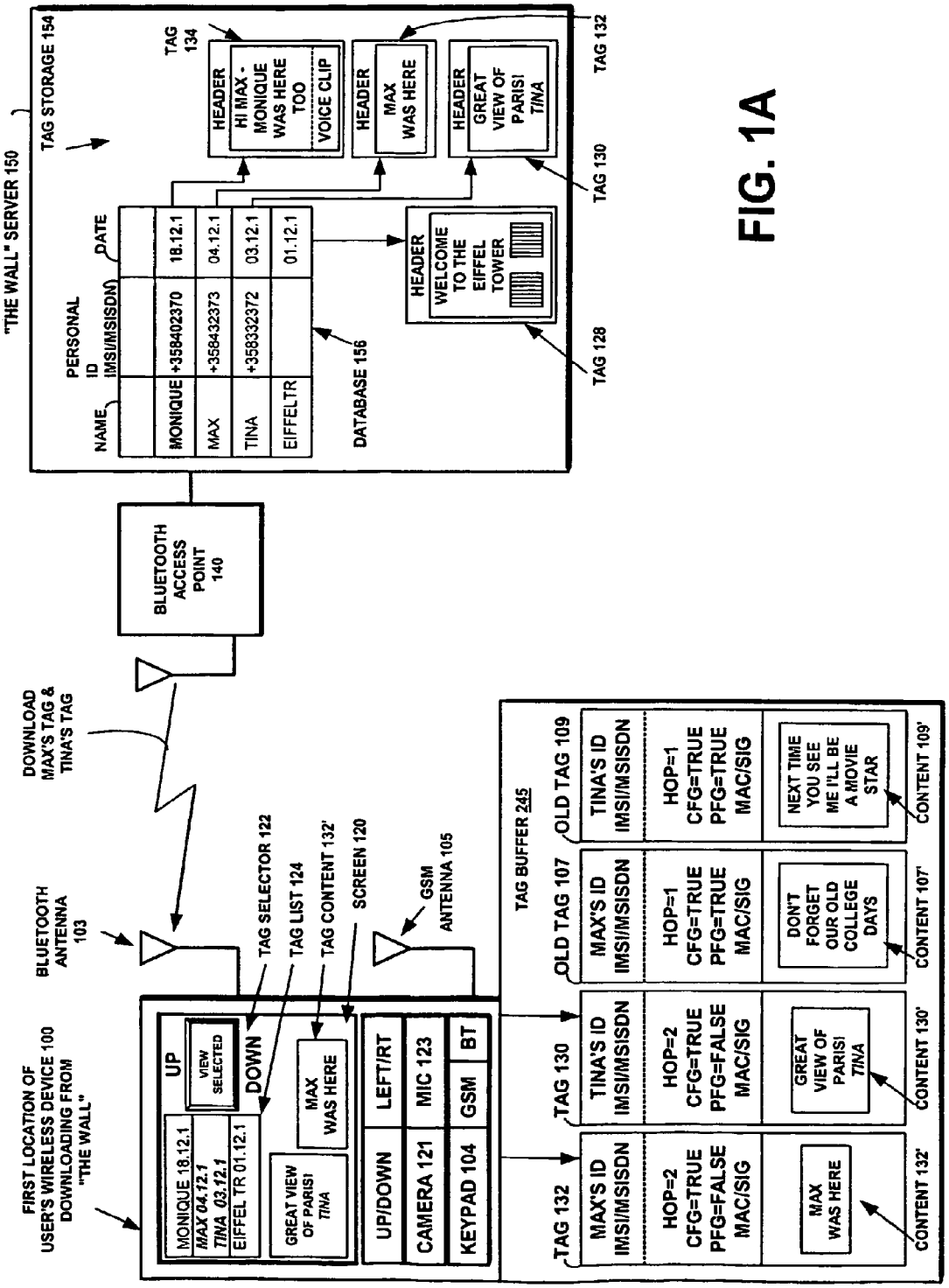

FIG. 1A illustrates the Bluetooth equipped cellular telephone downloading over the Bluetooth link selected tags 130 and 132 from "the wall" server, according to an embodiment of the present invention.

Figure 1B:
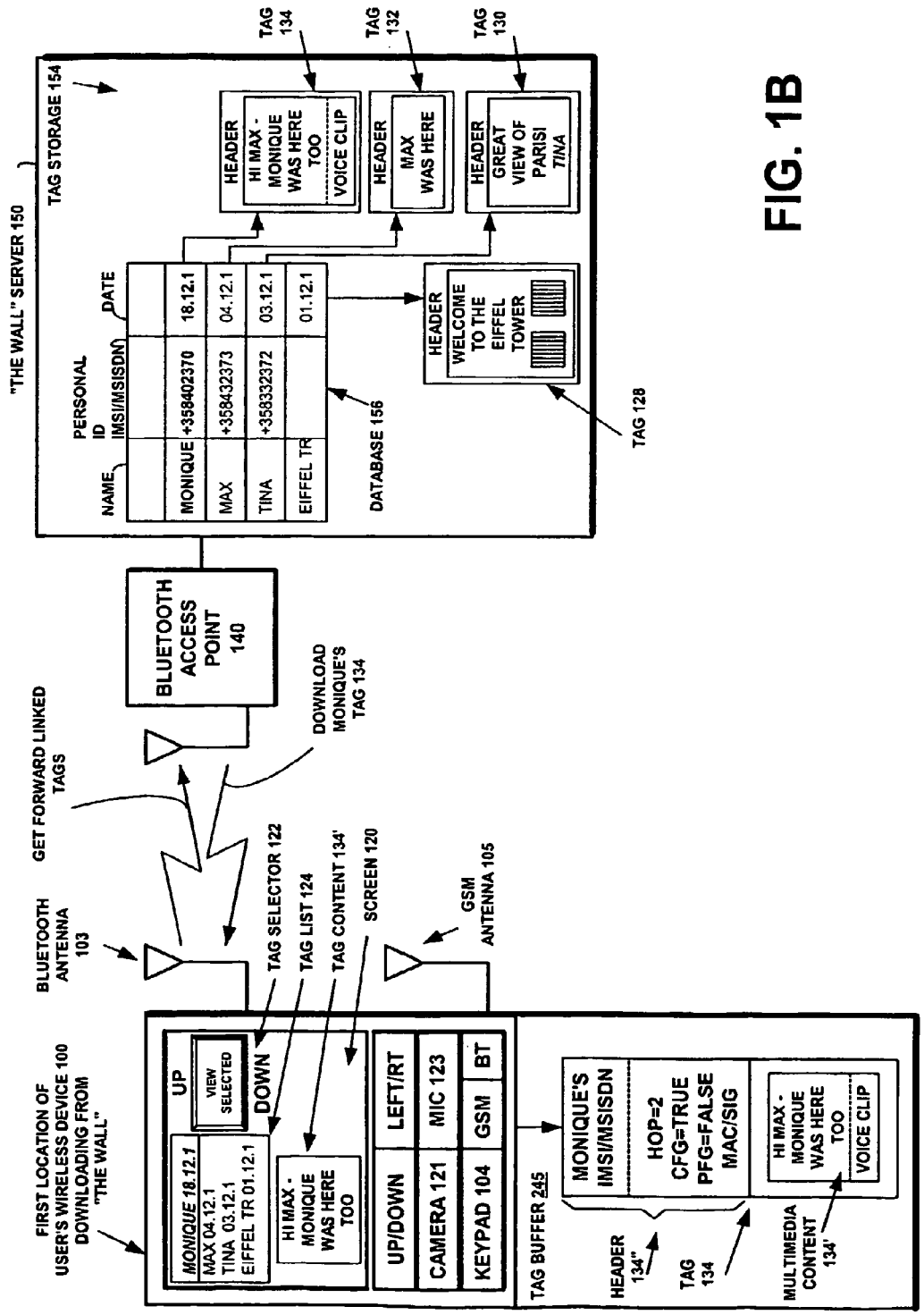

FIG. 1B illustrates the Bluetooth equipped cellular telephone downloading over the Bluetooth link a selected tag 134 from "the wall" server, according to an embodiment of the present invention. Tag 134 was found by using a forward pointer from the earlier tag 132, the forward pointer identifying the later tag 134 as part of a sequence of user comments that have been recorded on "the wall".

Figure 1C:
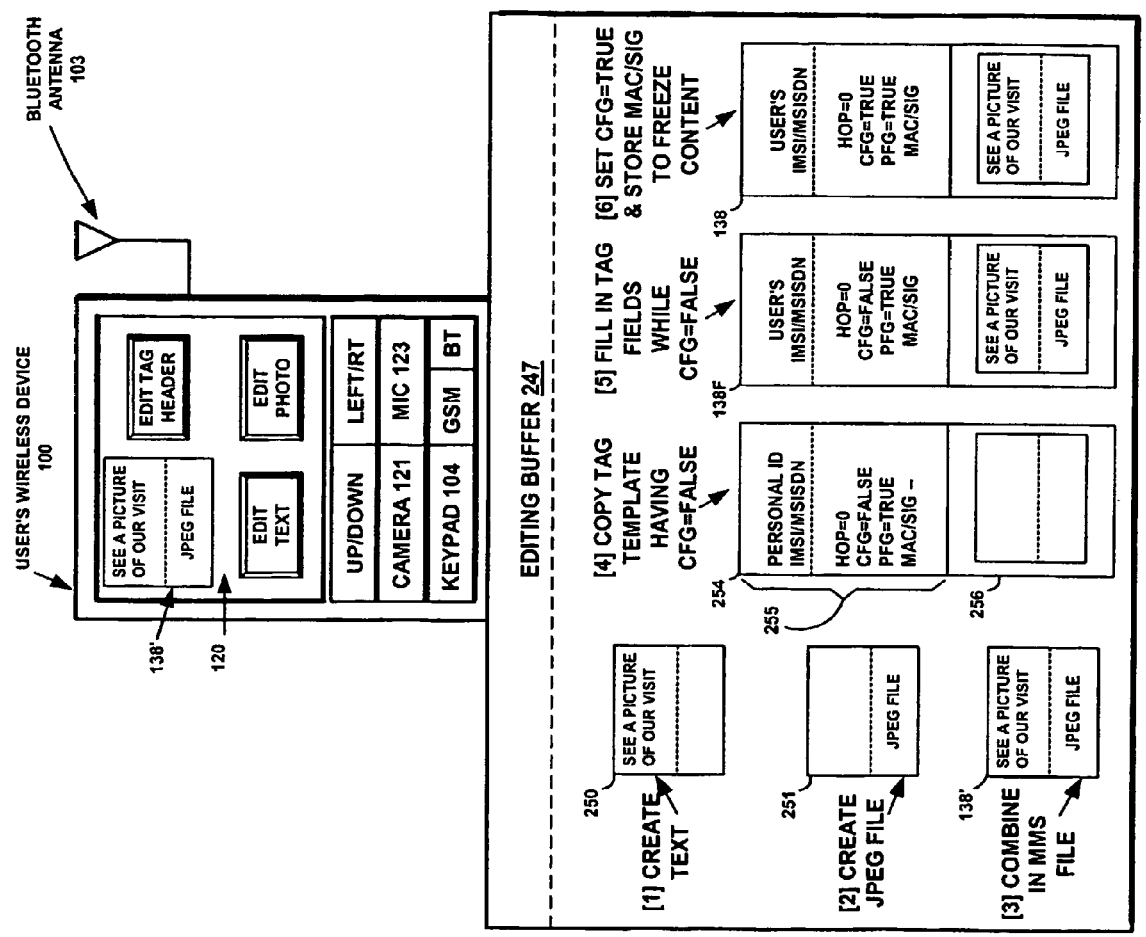

FIG. 1C illustrates the editing buffer 247 in the Bluetooth equipped cellular telephone, wherein a multimedia file 138' is created and then incorporated into a tag 138, according to an embodiment of the present invention.

Figure 1D:
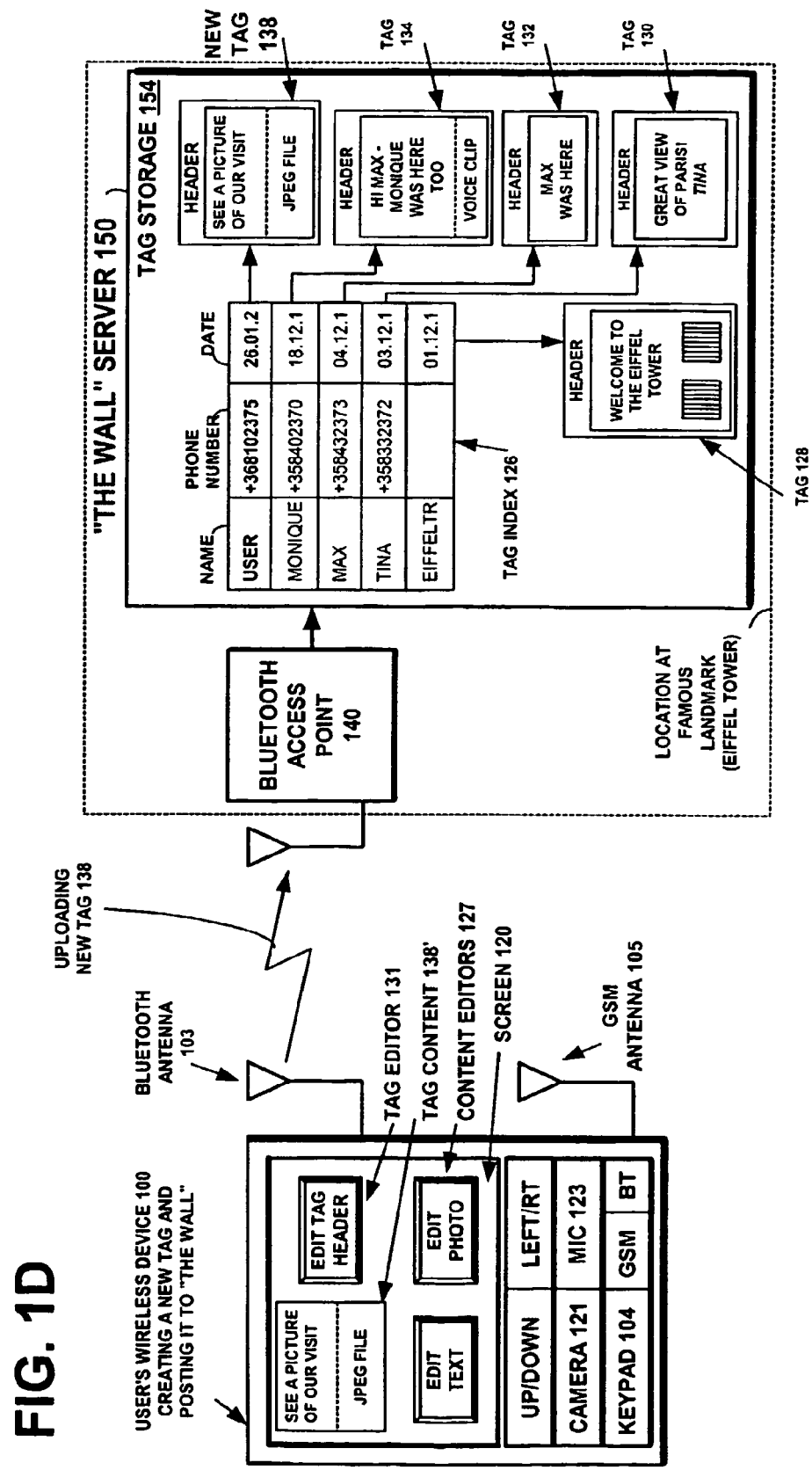

FIG. 1D illustrates the Bluetooth equipped cellular telephone uploading over the Bluetooth link the tag 138 to "the wall" server, to "paint the wall", according to an embodiment of the present invention.

Figure 1E:
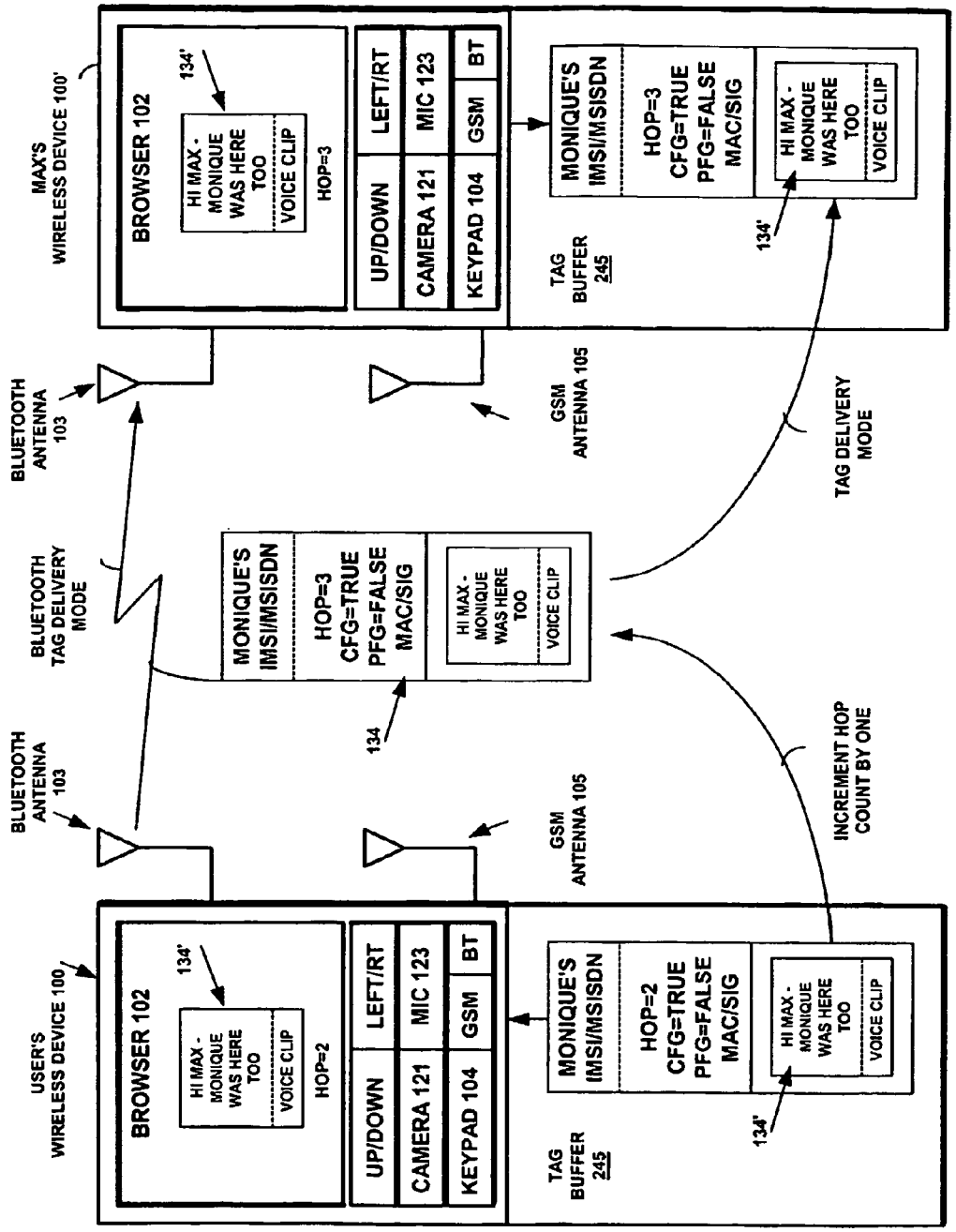

FIG. 1E illustrates the Bluetooth equipped cellular telephone 100 transferring the tag 134 over the Bluetooth link to a second Bluetooth equipped cellular telephone 100', using the "tag delivery" mode, whereby the sending user transfers a copy of the tag in the sender's device, causing the hop count to be incremented by one in the copy of the tag received by the recipient, according to an embodiment of the present invention.

Figure 1F:
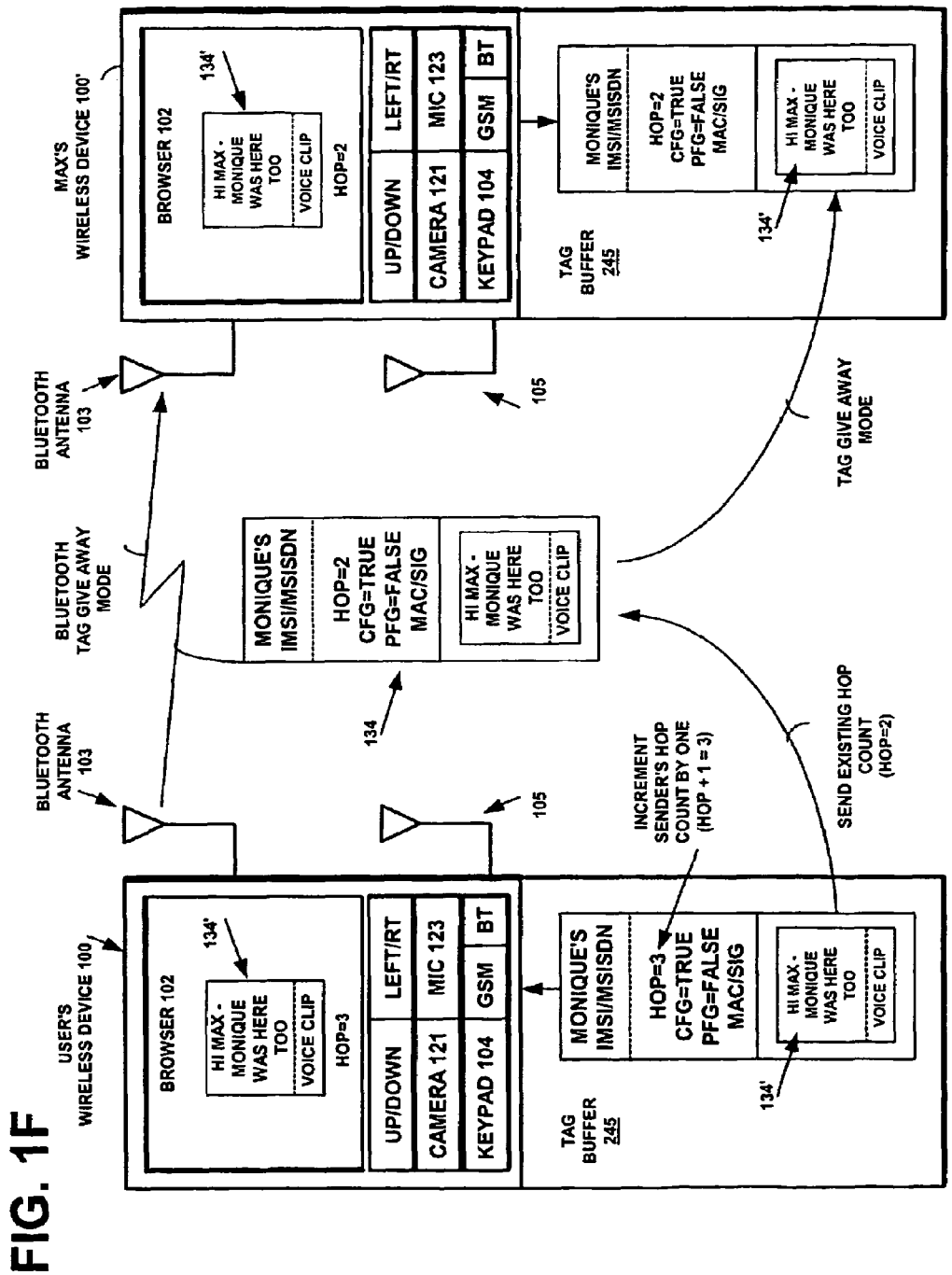

FIG. 1F illustrates the Bluetooth equipped cellular telephone 100 transferring the tag 134 over the Bluetooth link to the second Bluetooth equipped cellular telephone 100', using the "tag give-away" mode, whereby the sending user transfers the tag currently in the sender's device, causing the hop count to remain unchanged in the tag received by the recipient, according to an embodiment of the present invention. The sender effectively keeps a copy of the tag, and the copy in the sender's device is incremented by one.

Figure 1G:
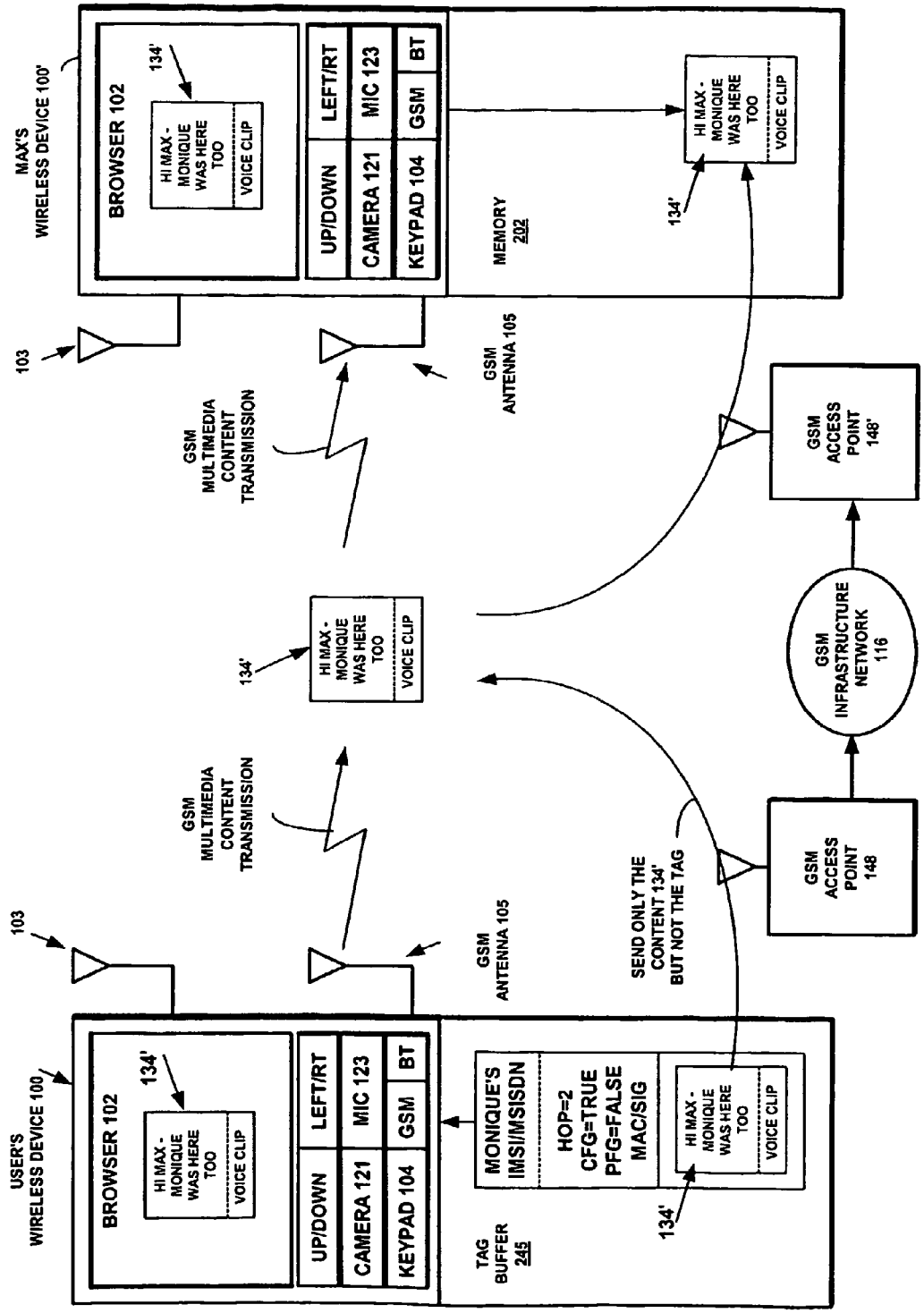

FIG. 1G illustrates the Bluetooth equipped cellular telephone 100 transferring over the cellular telephone network, the multimedia content 134' to the second Bluetooth equipped cellular telephone 100', according to an embodiment of the present invention.

Figure 1H:
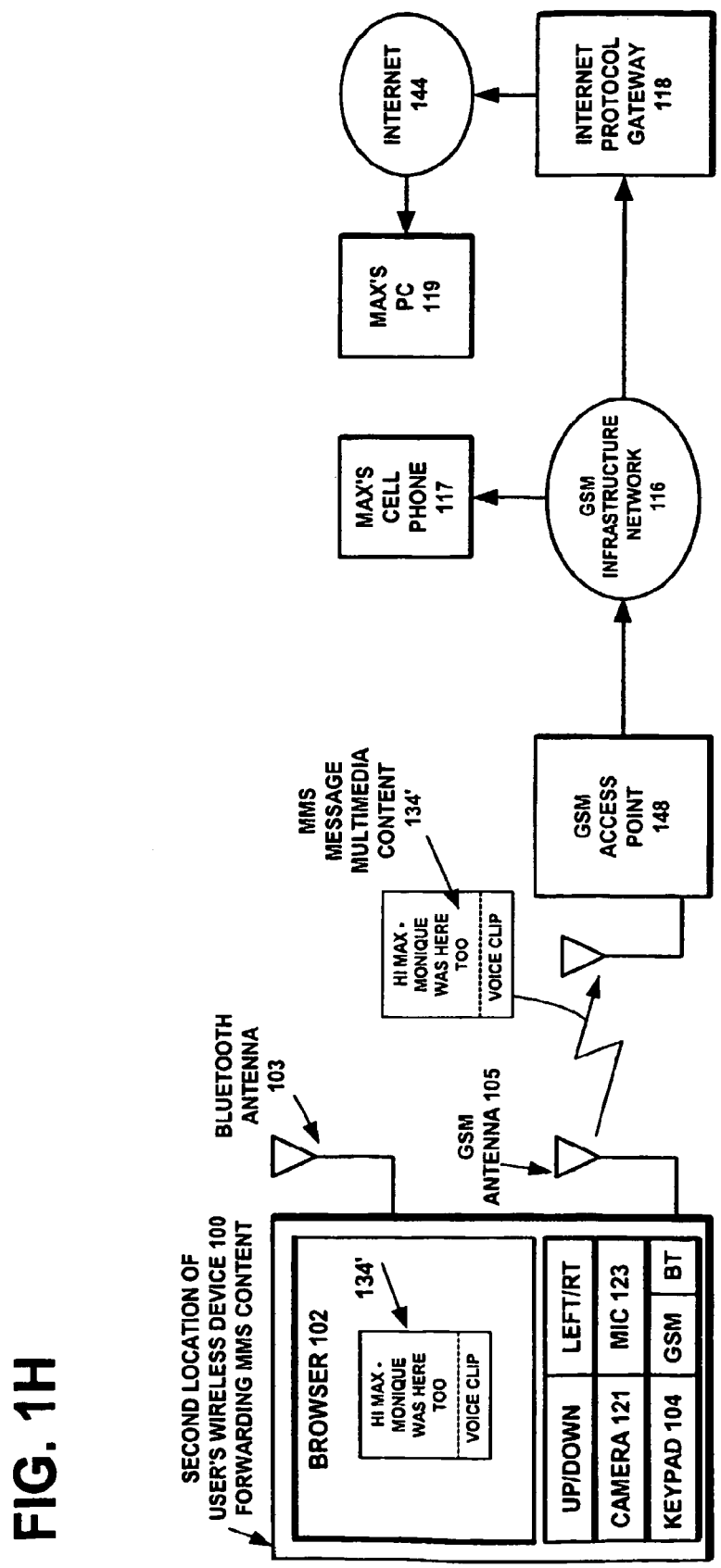

FIG. 1H illustrates the Bluetooth equipped cellular telephone 100 transferring over the cellular telephone network, the multimedia content 134' to either a cell phone or an Internet protocol gateway, according to an embodiment of the present invention.

Figure 2:
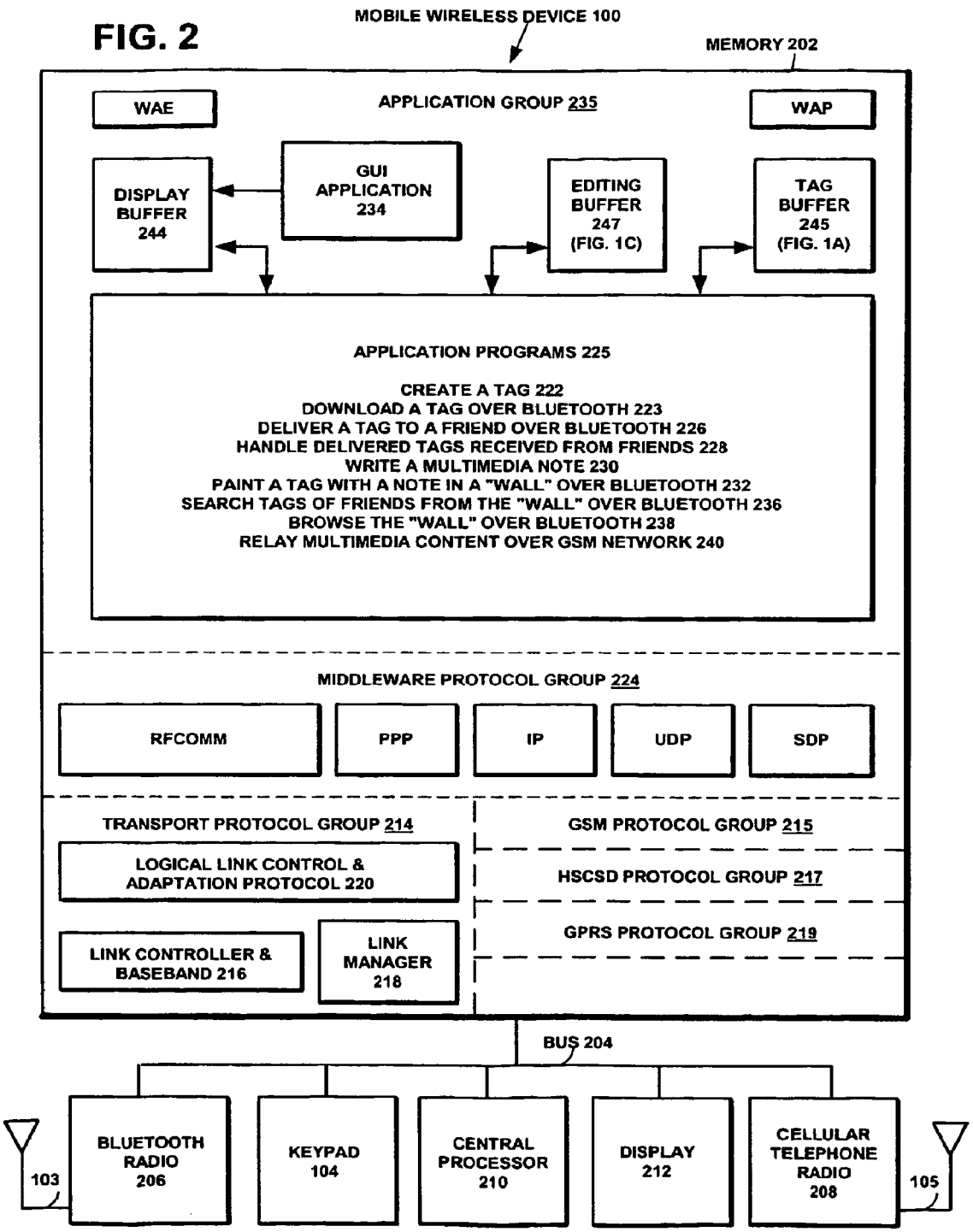

FIG. 2 illustrates the memory and components of the Bluetooth equipped cellular telephone 100, according to an embodiment of the present invention.

FIG. 2A is a flow diagram of the mobile wireless device communications processing method 500 in the applications programs 225 of the mobile wireless device 100.

Figure 3:
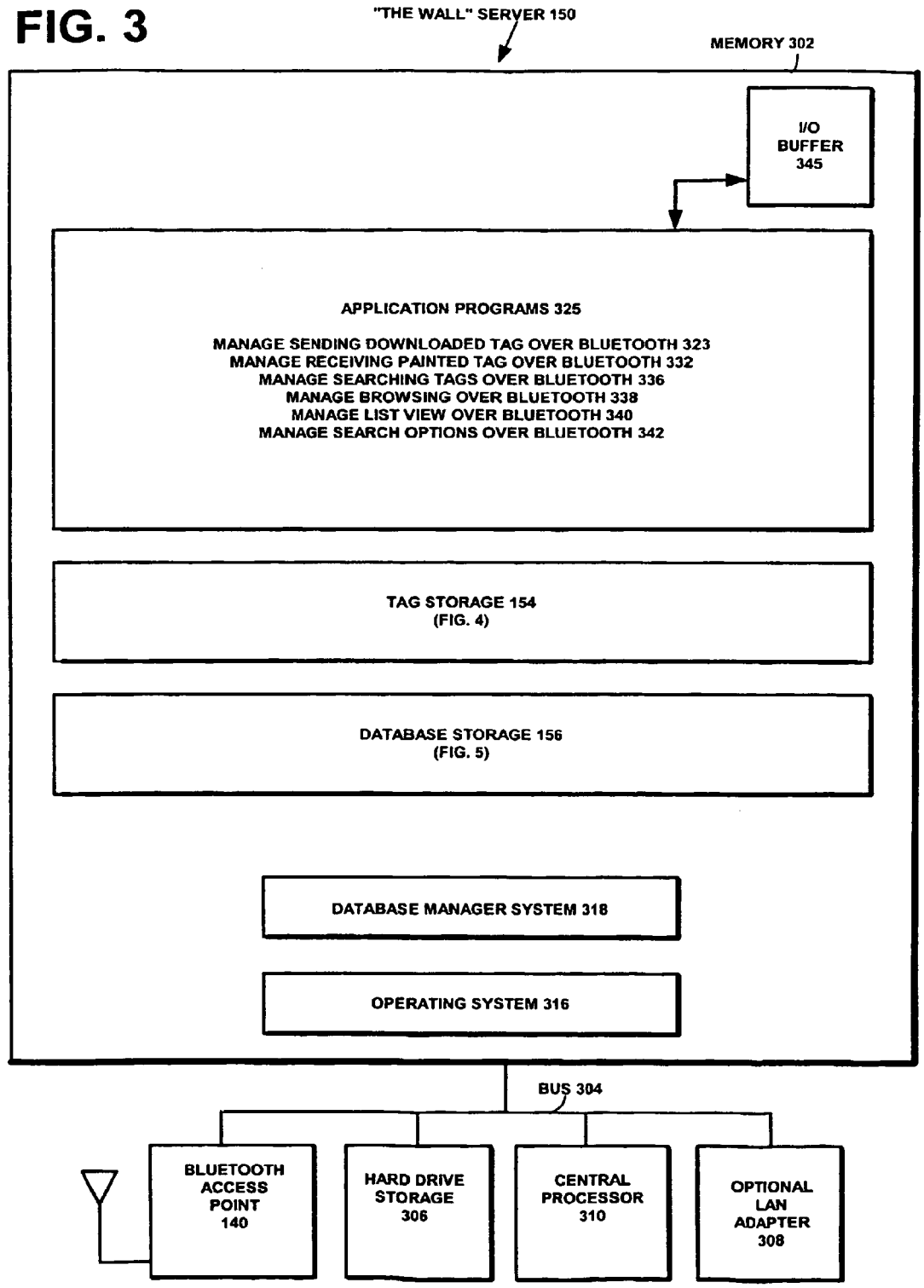

FIG. 3 illustrates the memory and components of the "the wall" server 150, according to an embodiment of the present invention.

Figure 3A:
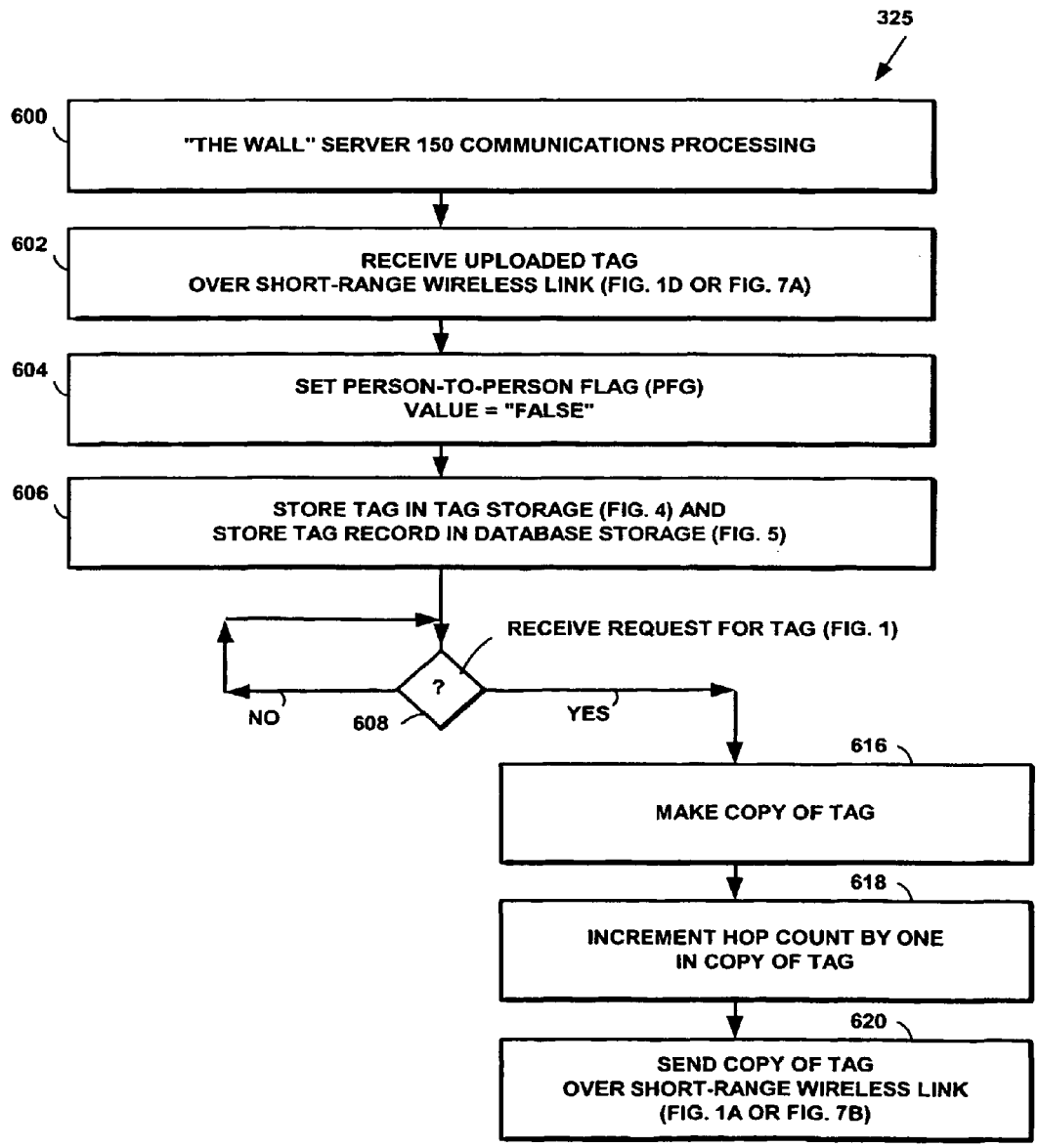

FIG. 3A is a flow diagram of "the wall" server communications processing method 600 in the applications programs 325 of "the wall" server 150.

Figure 4:
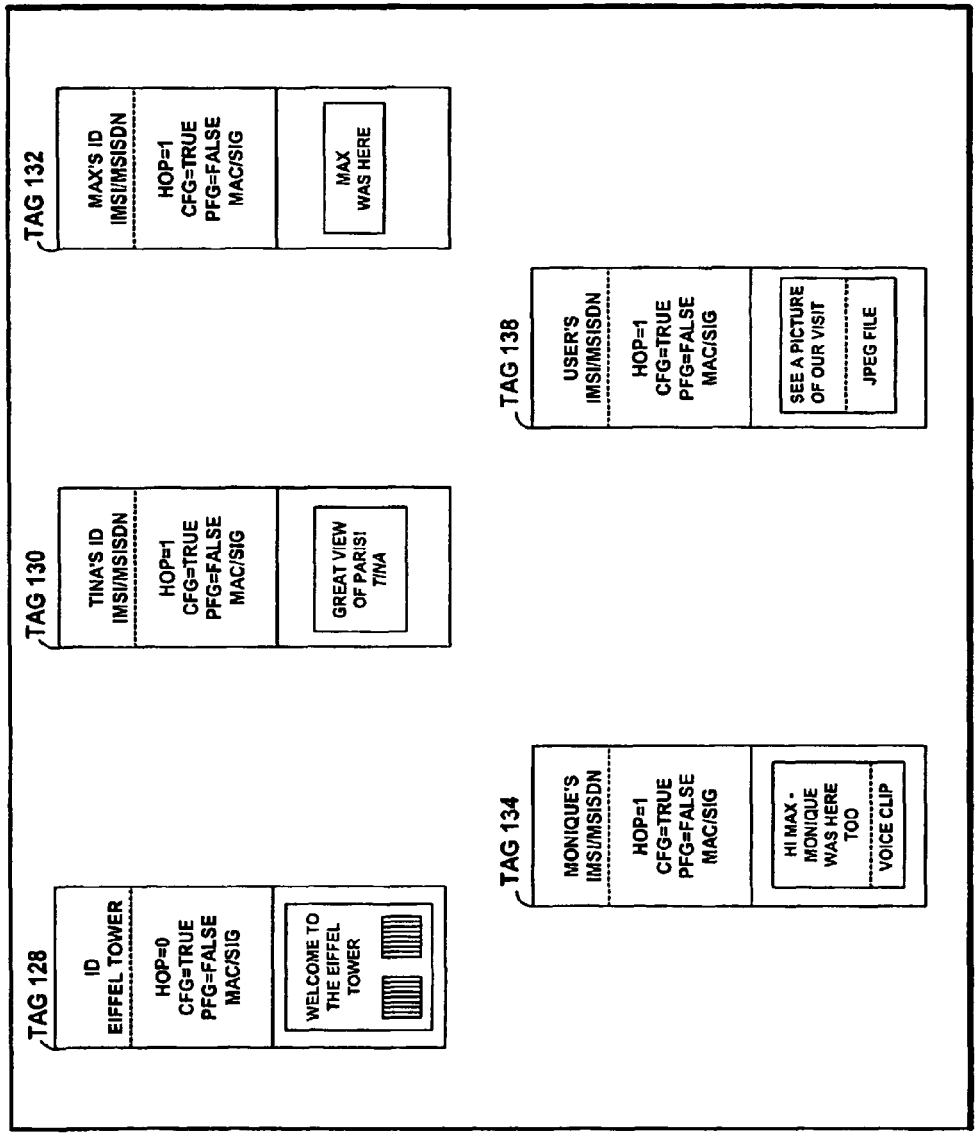

FIG. 4 illustrates the tag storage 154 in the "the wall" server 150, according to an embodiment of the present invention.

FIG. 5 illustrates the database storage 156 in the "the wall" server 150, according to an embodiment of the present invention.

Figure 6A:
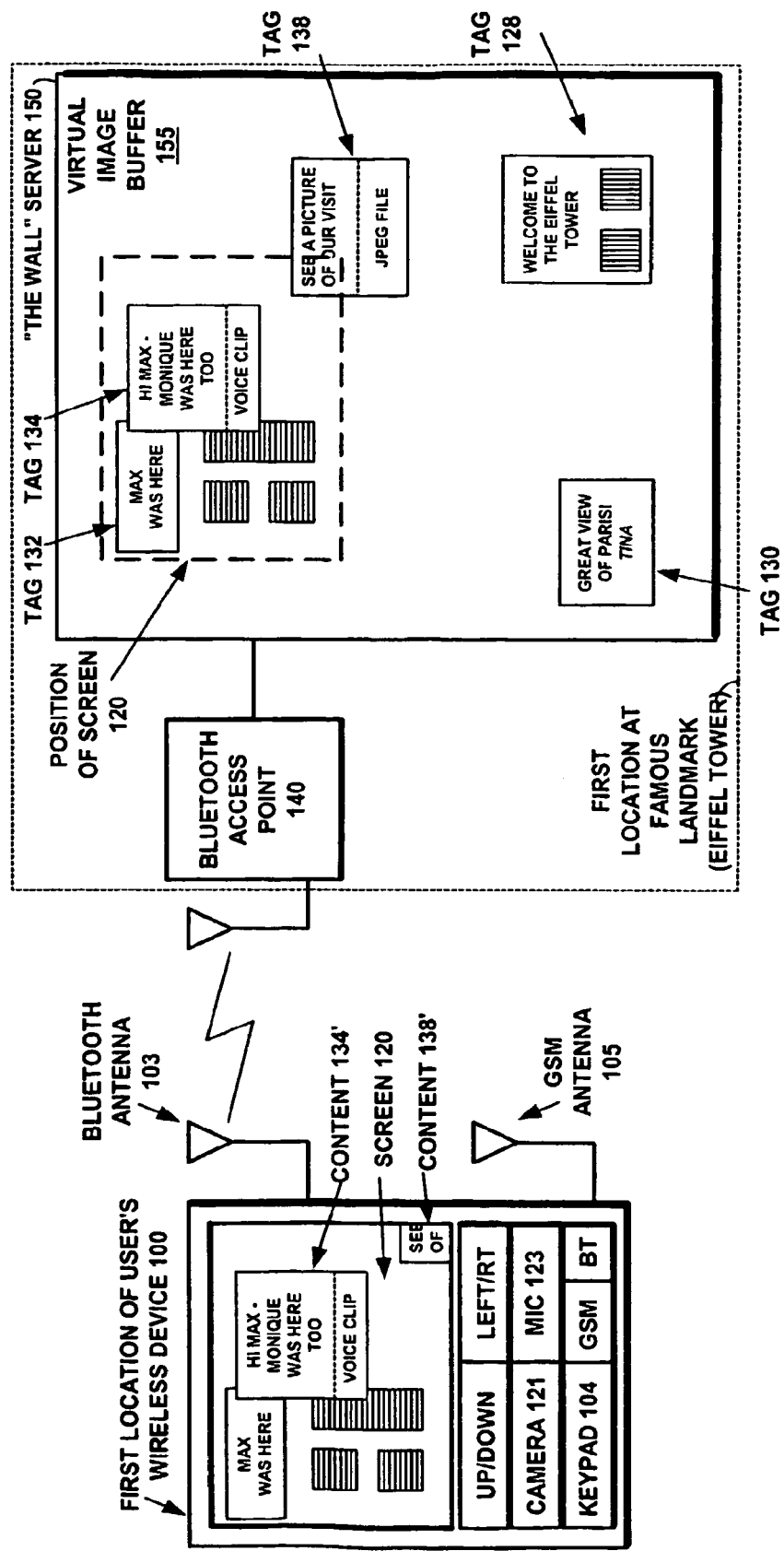

FIG. 6A illustrates an alternate embodiment of the invention, with the Bluetooth equipped cellular telephone 100 browsing over the Bluetooth link for tags in "the wall" server 150, according to an embodiment of the present invention. The server 150 is programmed to store the tags in association with two dimensional X,Y coordinates, in a virtual viewing space. A user can browse tags that have been posted on "the wall", by using up/down and left/right controls of the user's Bluetooth device.

Figure 6B:
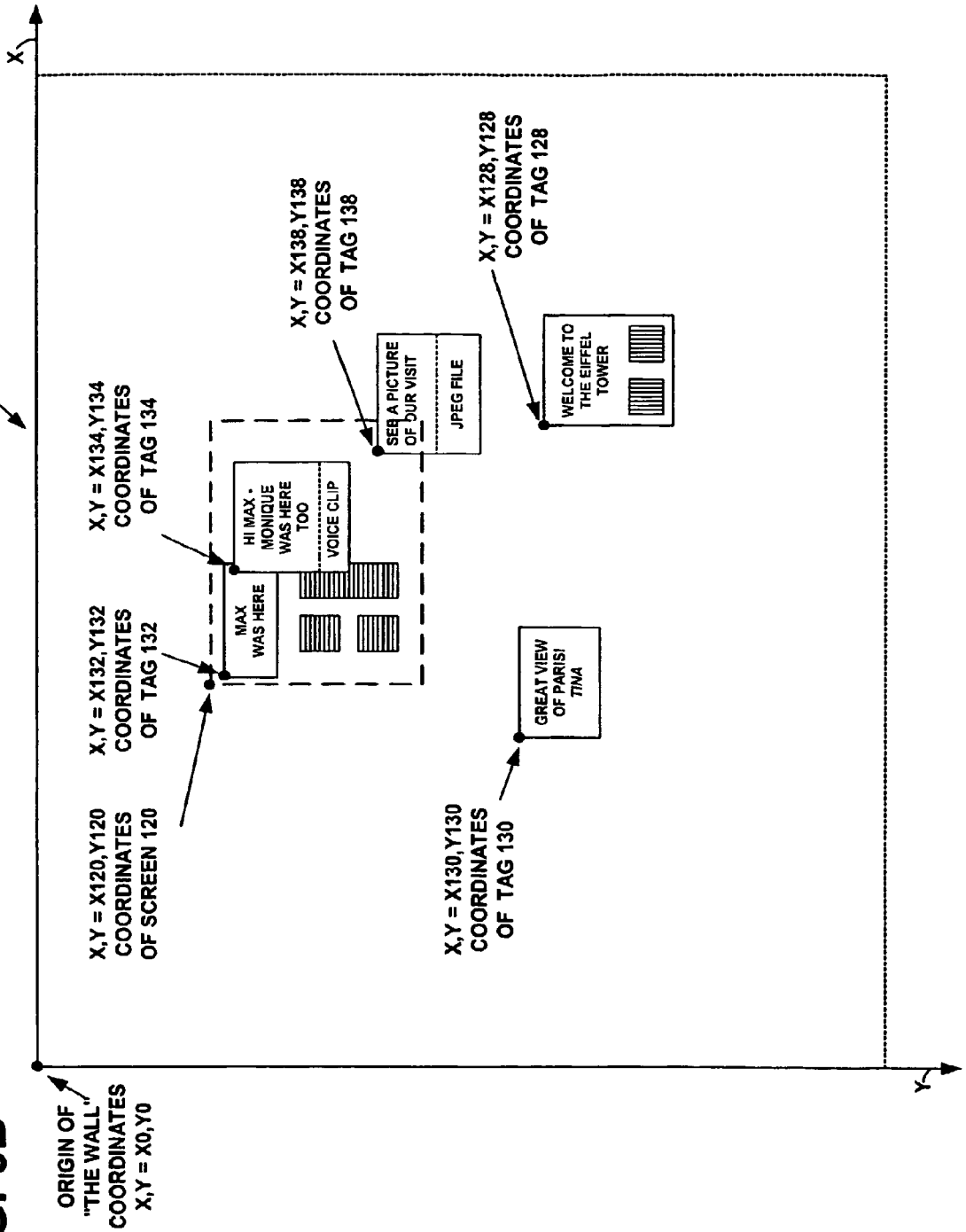

FIG. 6B illustrates the virtual, two-dimensional viewing space in the alternate embodiment of the invention, according to an embodiment of the present invention.

Figure 7A:
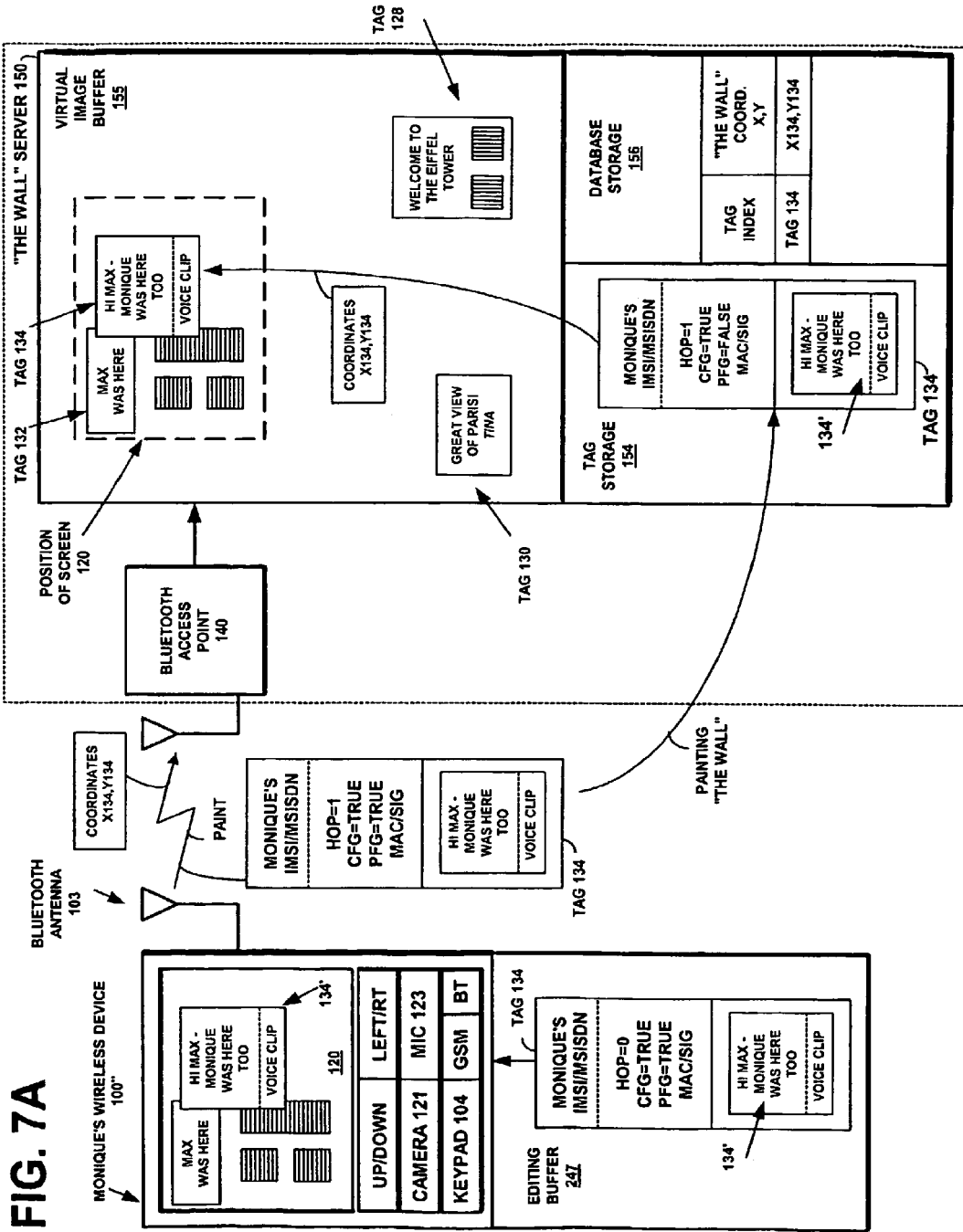

FIG. 7A illustrates a Bluetooth equipped cellular telephone 100" uploading the tag 134 over the Bluetooth link to "the wall" server, to "paint the wall", in the alternate embodiment of the invention, according to an embodiment of the present invention.

Figure 7B:
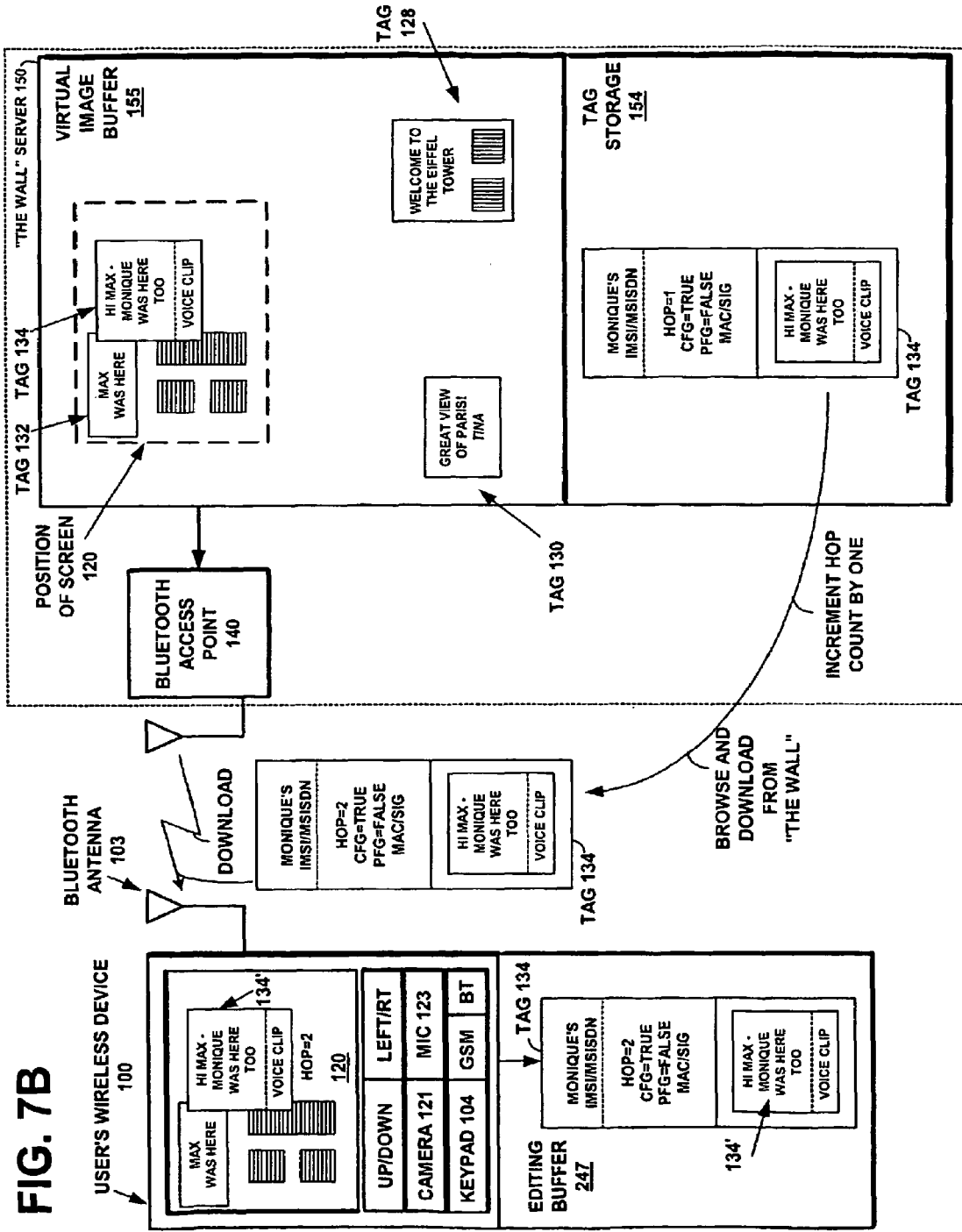

FIG. 7B illustrates the Bluetooth equipped cellular telephone 100 downloading tag 134 over the Bluetooth link from "the wall" server, in the alternate embodiment of the invention, according to an embodiment of the present invention.

Figure 8:
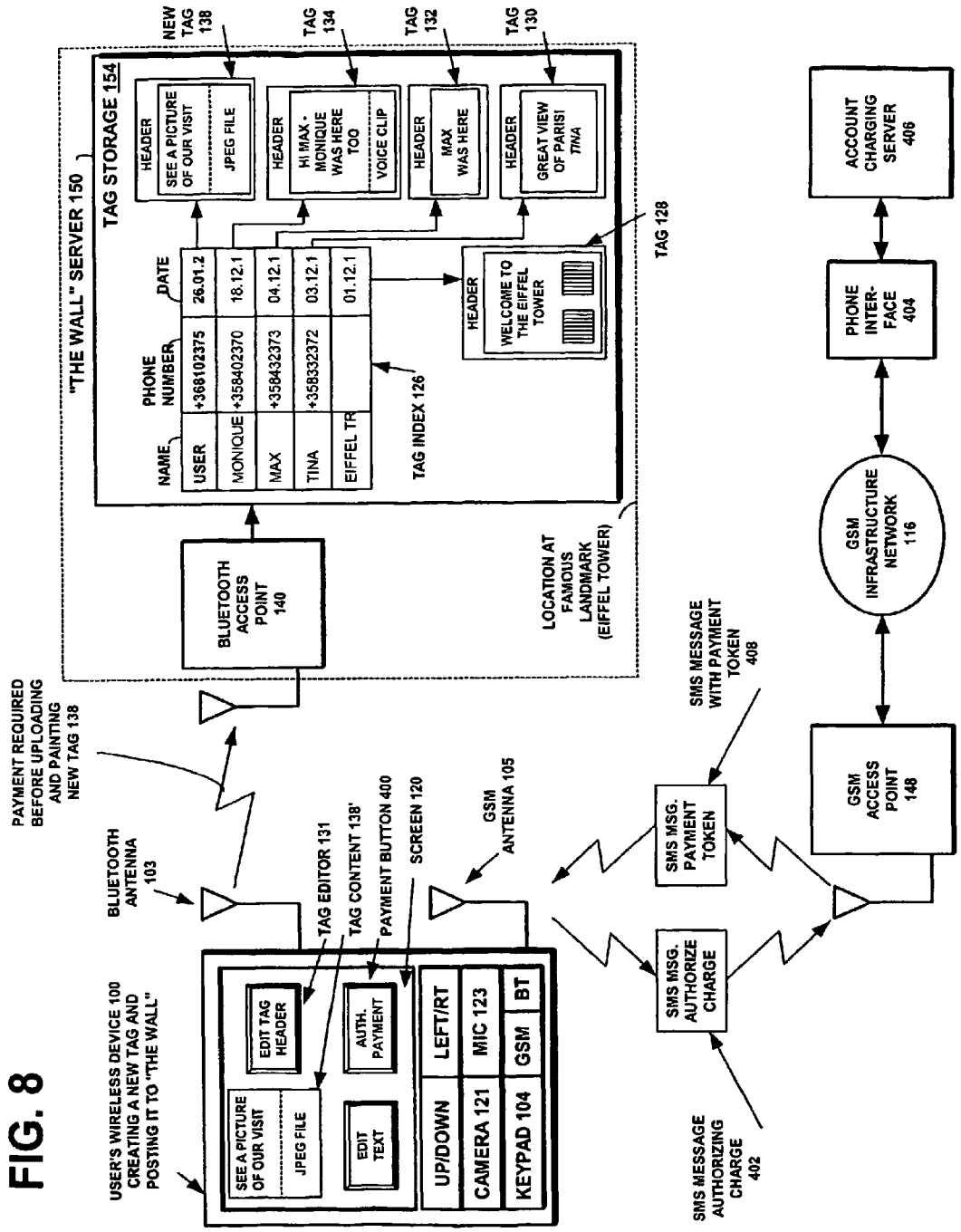

FIG. 8 illustrates another alternate embodiment of the invention, wherein payment is required before user's device 100 is allowed to upload a tag 138 over the Bluetooth link to "paint the wall" of the server 150, according to an embodiment of the present invention. The Bluetooth equipped cellular telephone 100 sends an SMS charge authorizing message over the cellular telephone system to an account-charging server, authorizing the account to be charged. The account-charging server returns an SMS payment token to the user's device over the cellular telephone system.

Figure 9:
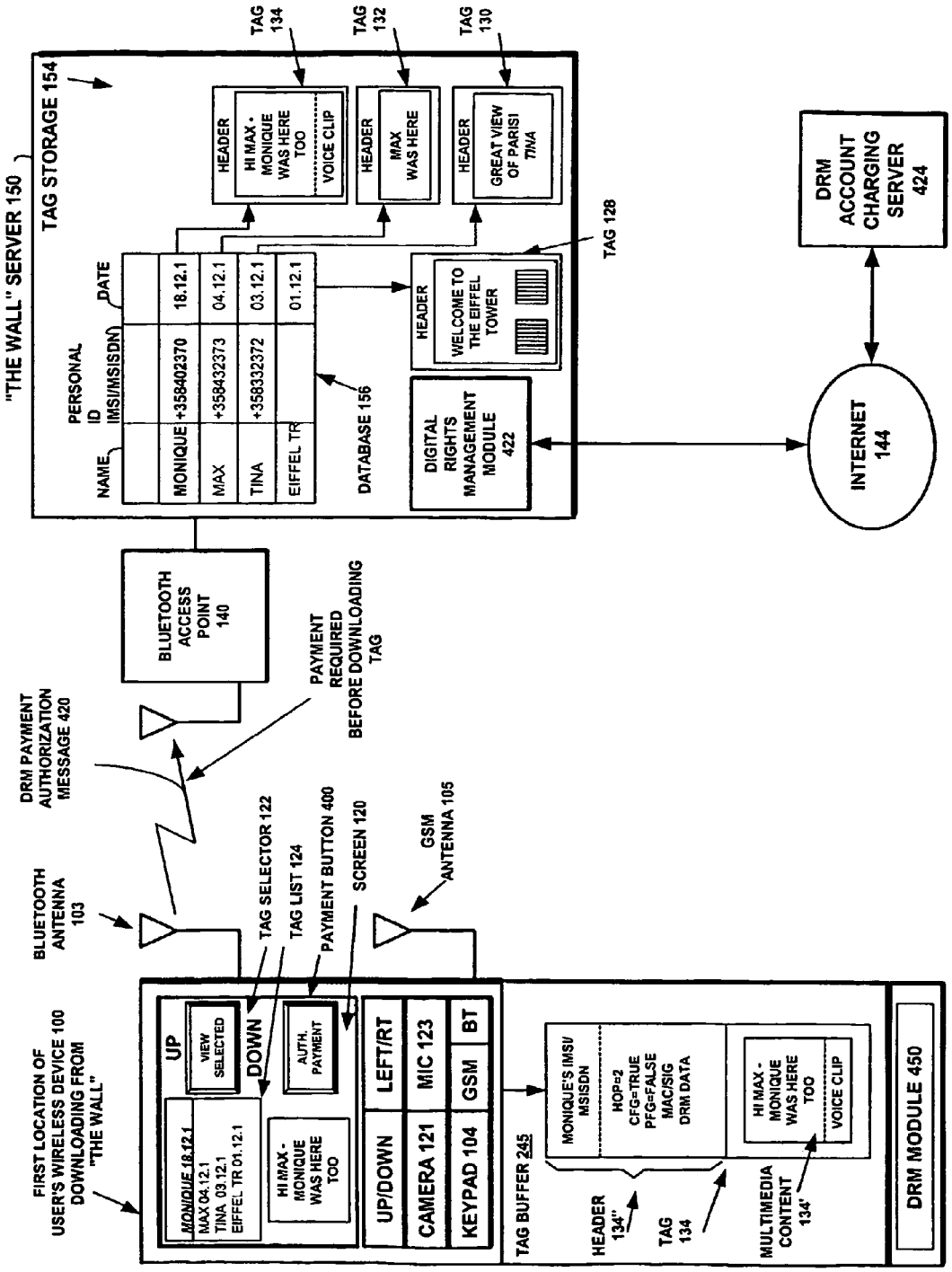

FIG. 9 illustrates another alternate embodiment of the invention, wherein payment is required before a user is allowed to download a tag over the Bluetooth link from the "the wall" server, according to an embodiment of the present invention. A digital rights management (DRM) authorization message is sent by the user's device 100 over the Bluetooth link to "the wall" server 150. A DRM module 422 in the server 150 is connected over a network such as the Internet, to a DRM account-charging server 424. The DRM account charging server handles the necessary steps in debiting the user's account, and then returns an enabling signal to "the wall" server. "The wall" server then downloads over the Bluetooth link, the tag requested by the user.

Figure 10:
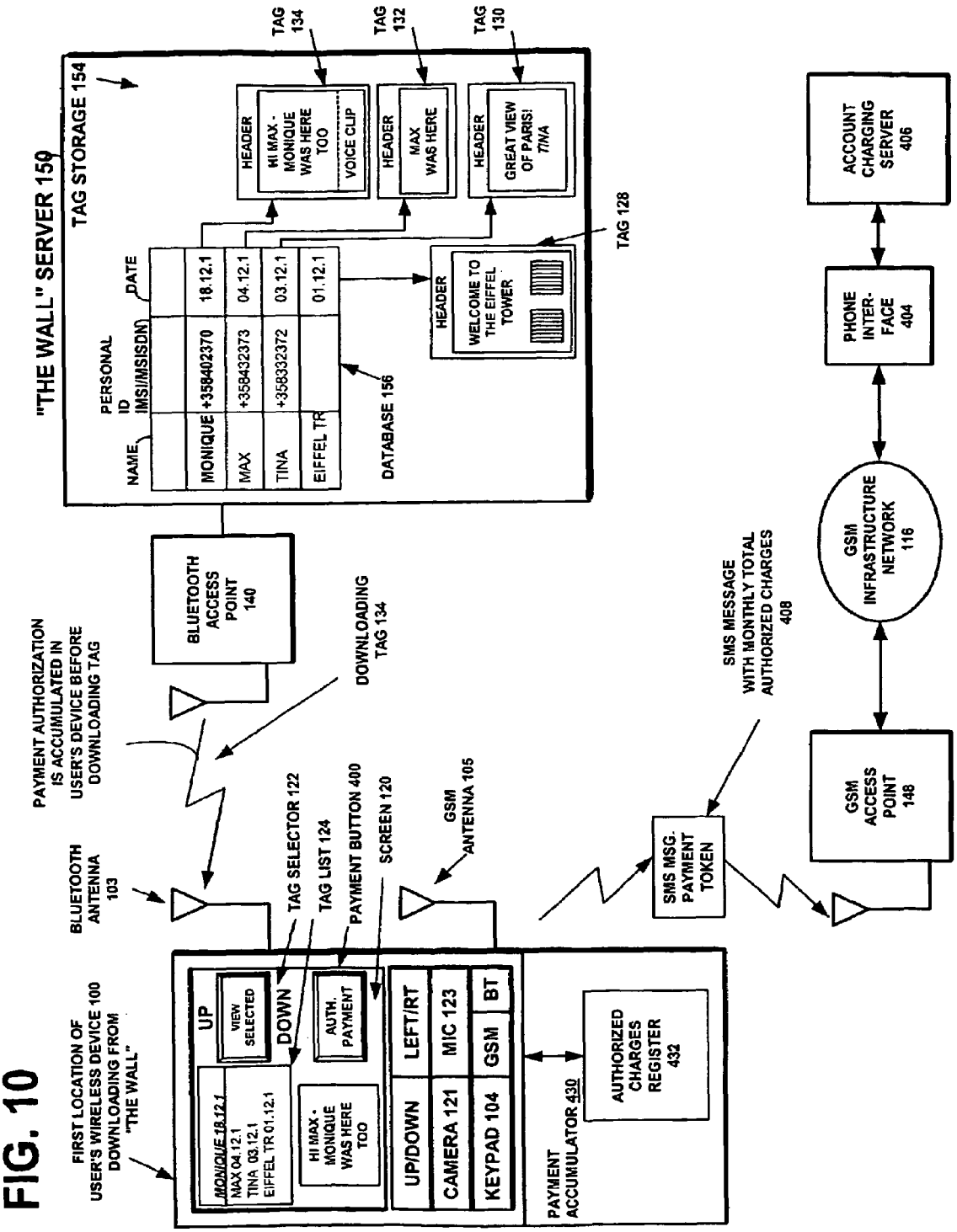

FIG. 10 illustrates another alternate embodiment of the invention, wherein payment is required before a user is allowed to download a tag over the Bluetooth link from the "the wall" server; according to an embodiment of the present invention. A payment accumulator 430 is included in the user's device 100, that accumulates authorized charges for downloading a plurality of tags from one or many "wall" servers 150, etc. over an extended period, such as a month. At the end of the month, the Bluetooth equipped cellular telephone 100 sends an SMS message containing the monthly total authorized charges, sending it over the cellular telephone system to an account-charging server 406, authorizing the account to be charged.

Figure 11:
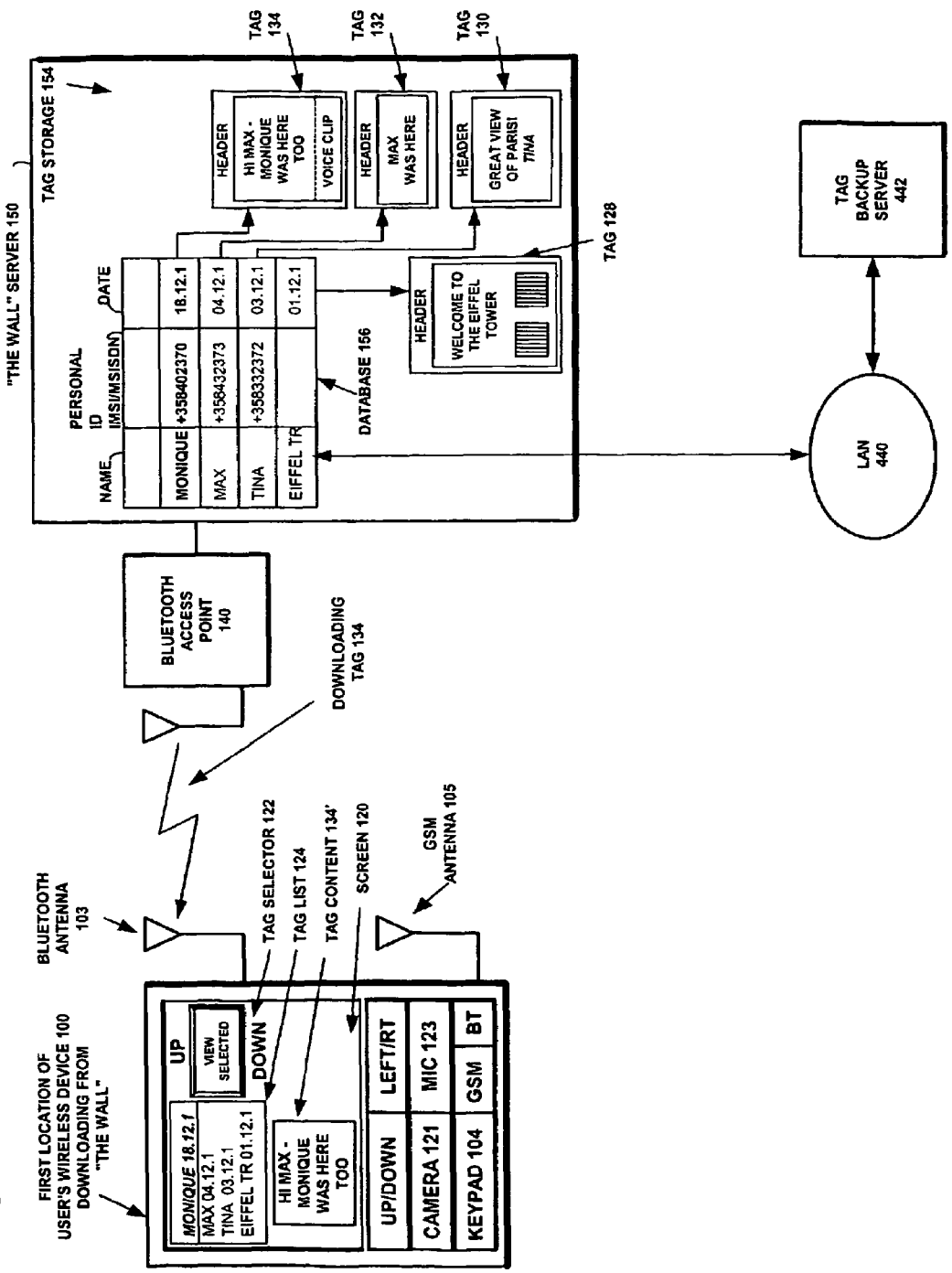

FIG. 11 illustrates another alternate embodiment of the invention, wherein "the wall" server 150 is connected to a remote, backup server 442 that stores a copy of all of the tags and the database, to be used in the event of disaster recovery, according to an embodiment of the present invention. Additionally, the backup server 442 provides an accessible, bulk storage for old tags, to reduce the storage requirements on "the wall" server 150.

Figure 12:
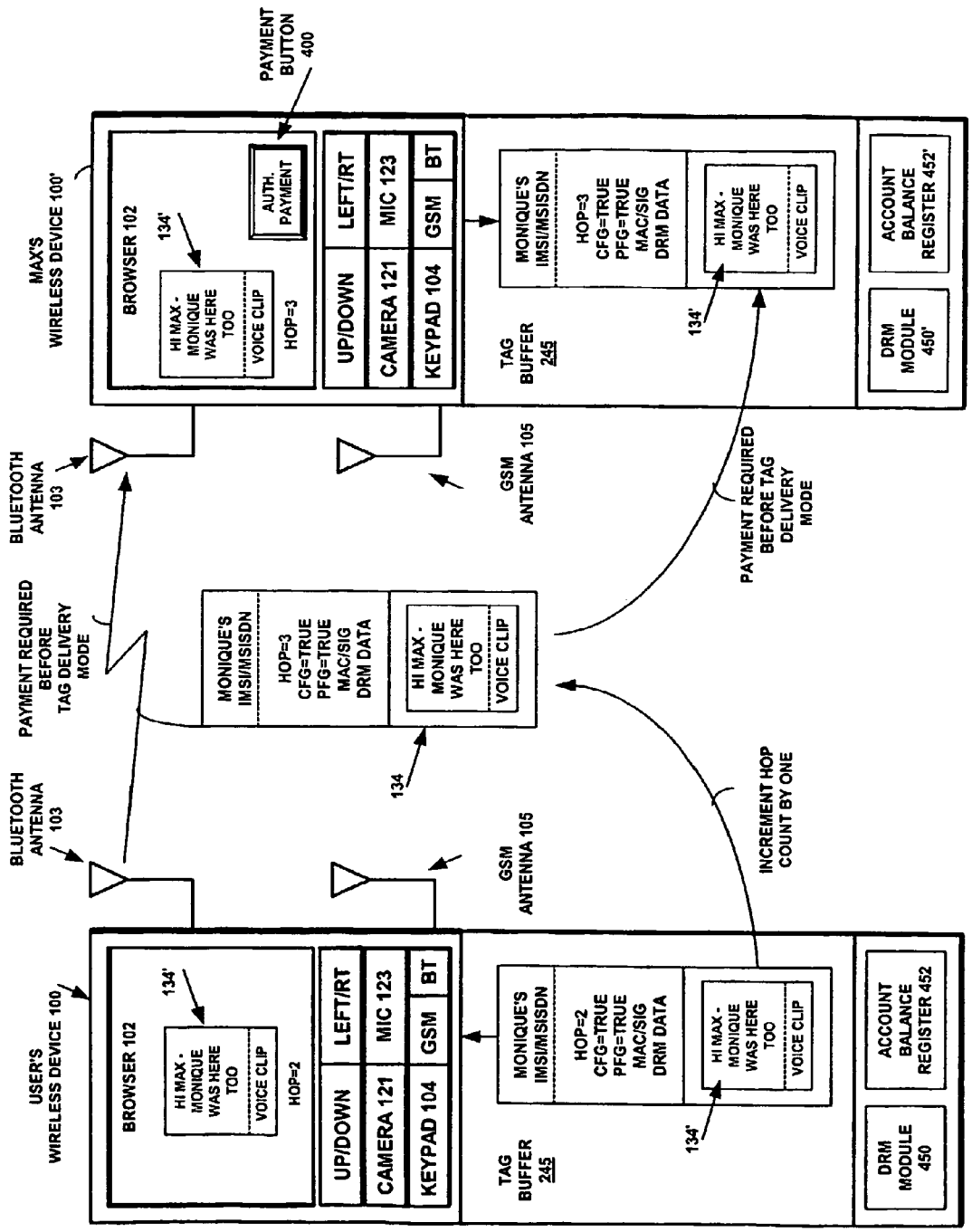

FIG. 12 illustrates another alternate embodiment of the invention, wherein payment is required from a requesting user's device 100', before a providing user's device 100 will transfer a tag over the Bluetooth link to the requesting user's device, according to an embodiment of the present invention. A digital rights management (DRM) module 450 in each mobile wireless device handles the exchange of charge authorization messages over the Bluetooth link between the mobile devices. The DRM module 450' in the requestor's device 100' sends a charge authorizing message to the provider's device 100. The provider's device 100 then sends the tag requested by the requestor's device 100', over the Bluetooth link.

Figure 13:
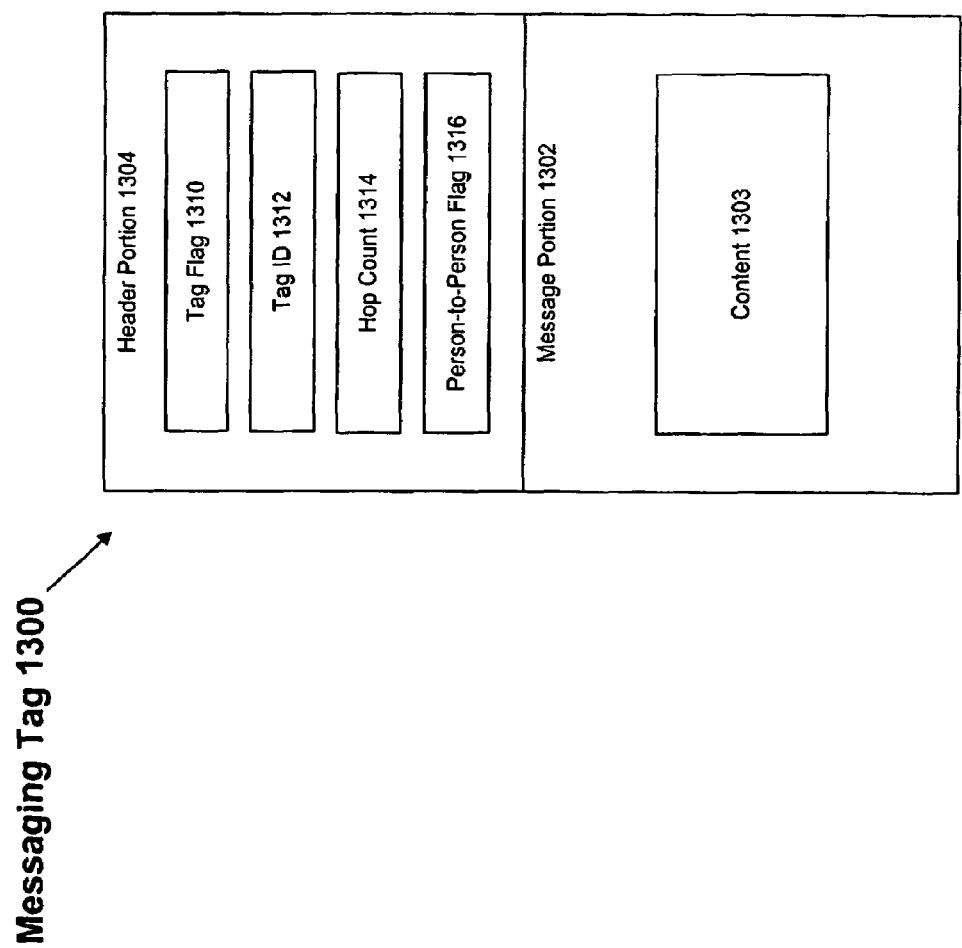

FIG. 13 is a diagram illustrating the format of an exemplary multimedia content tag 1300 that includes a message portion 1302, and a header portion 1304. The header portion includes various fields to facilitate the transfer of tags. In further embodiments, such fields may be embedded inside a standard message structure as an internal header.

Figure 14:
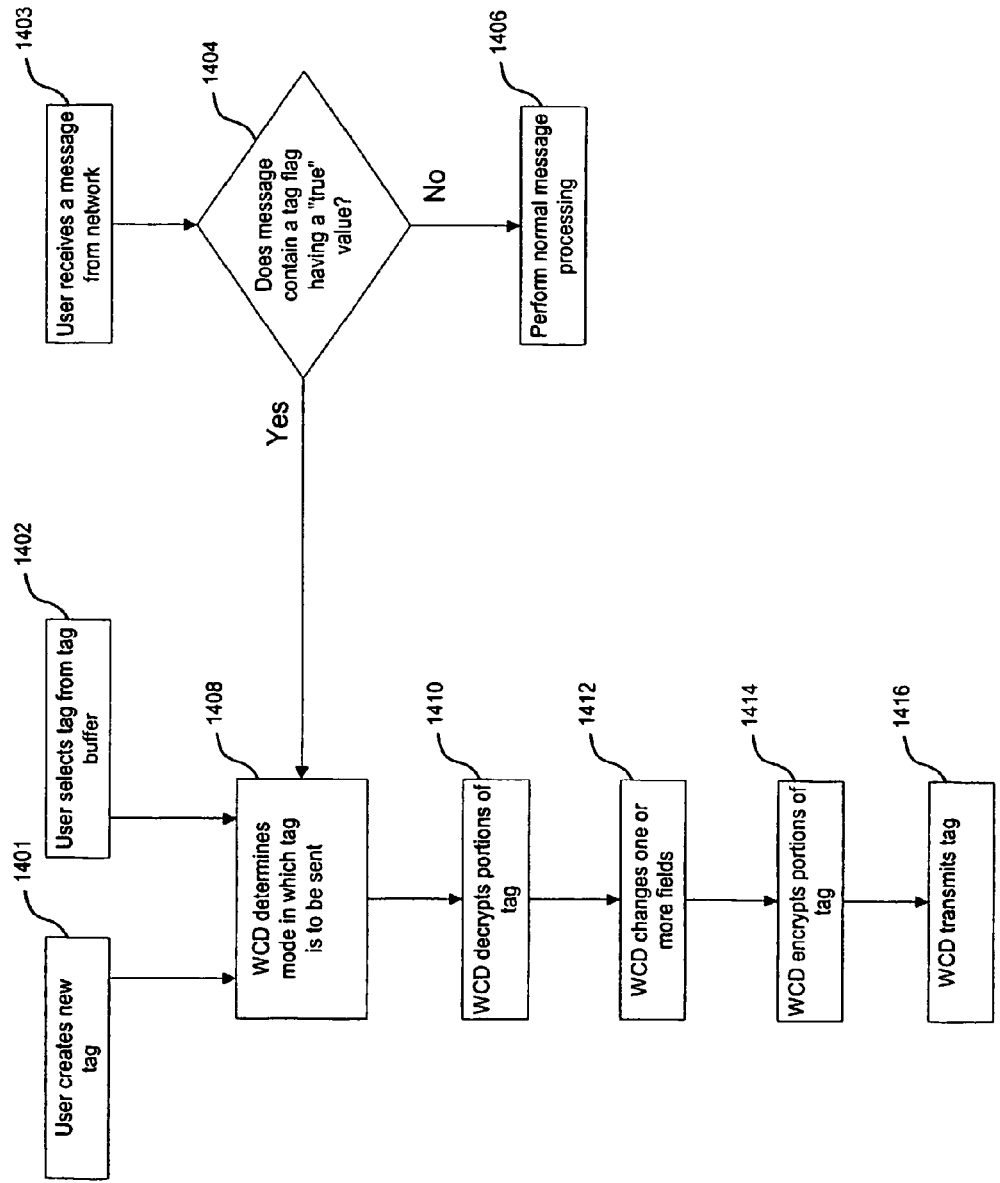

FIG. 14 is a flowchart illustrating the processing of a multimedia messaging tag by a wireless communications device (WCD).

Figure 15A:
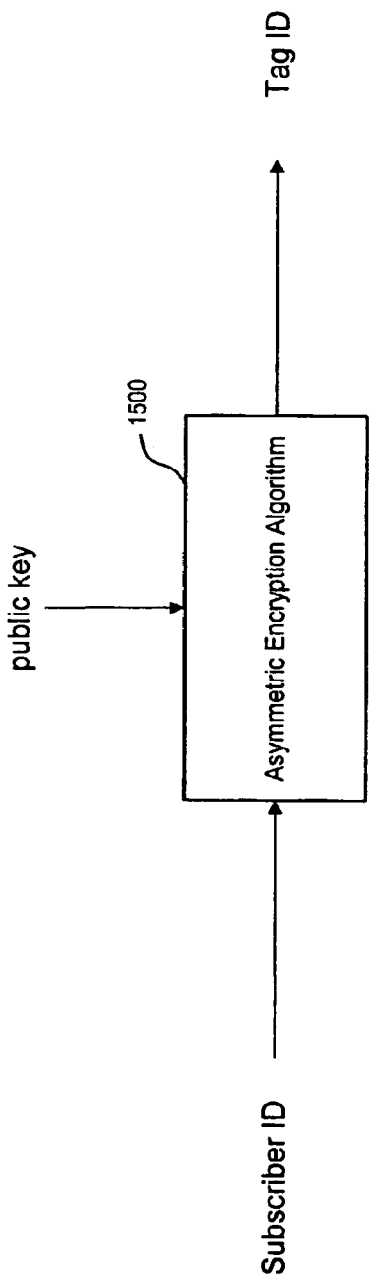
Figure 15B:
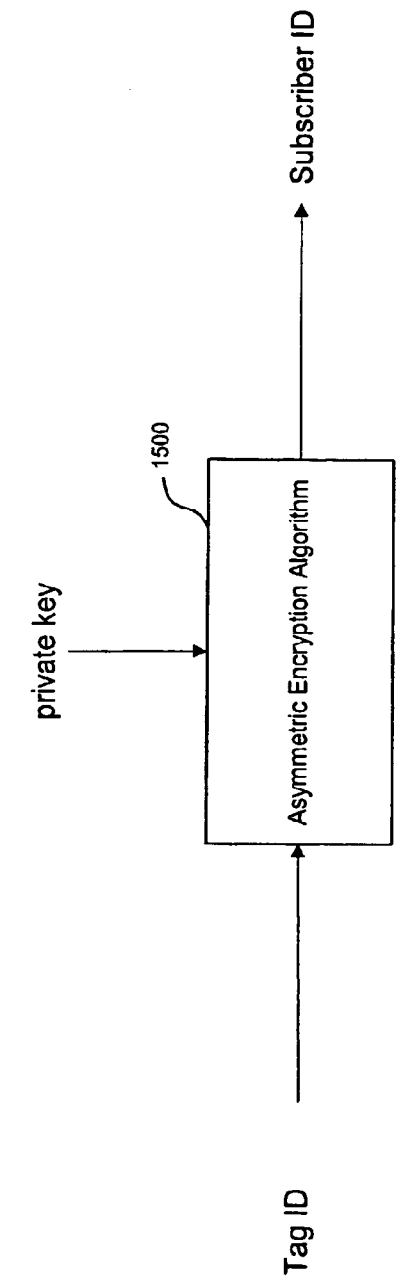

FIGS. 15A and 15B are diagrams that illustrate relationships between a subscriber ID 1502 and its corresponding tag ID 1504. This relationship is based on an asymmetric encryption algorithm.

Figure 16:
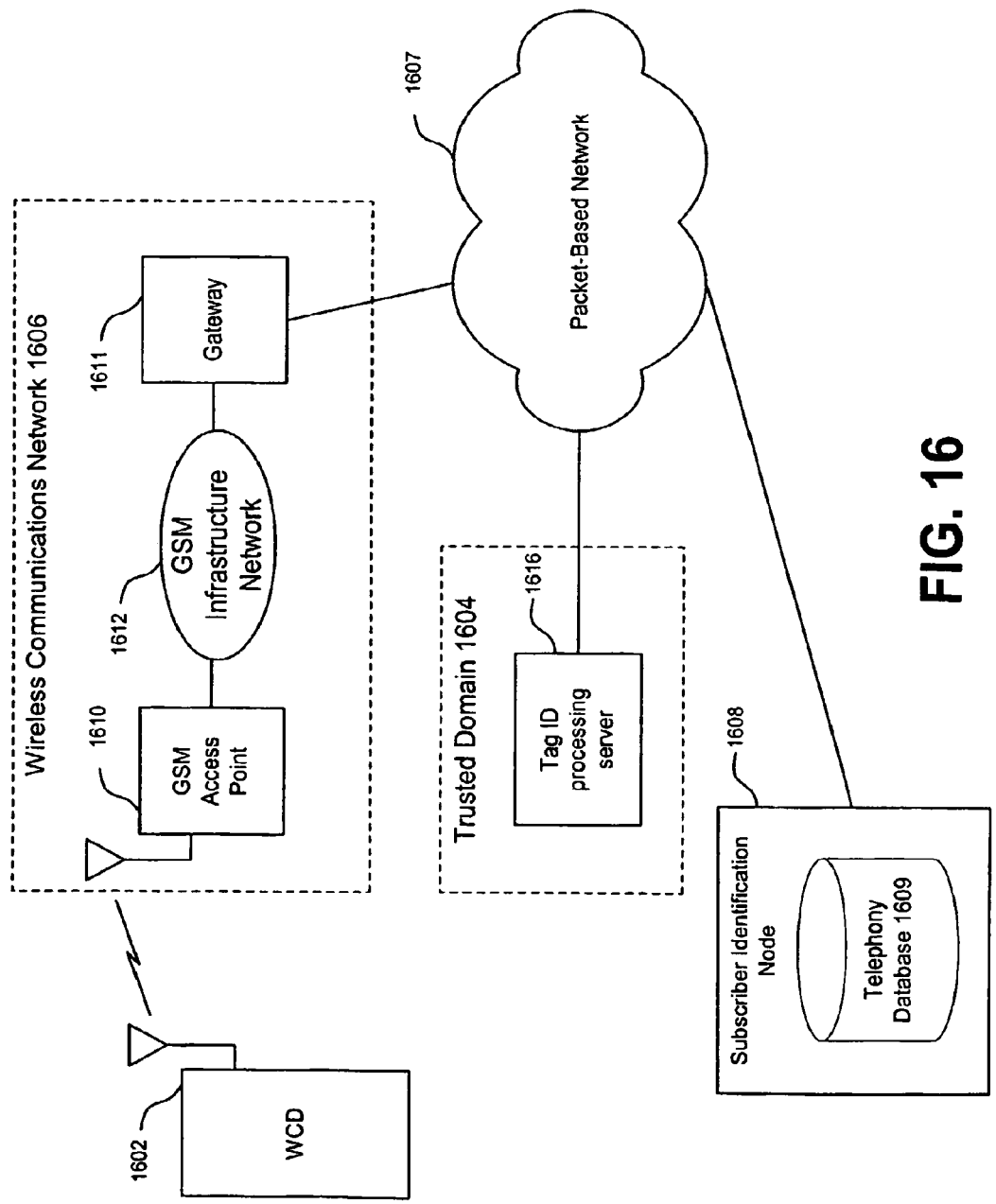

FIG. 16 is a block diagram of an operational environment that includes a wireless communications device a tag ID processing server 1616, and a subscriber identification node 1608. In this environment, tag ID configuration processes and tag ID resolution services may be performed.

Figure 17:
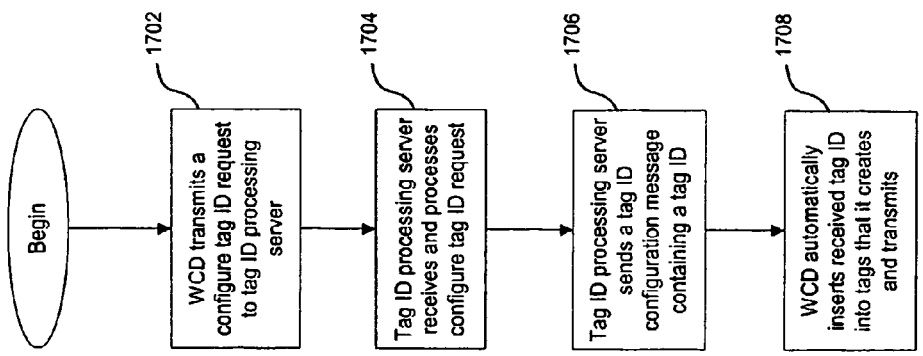

FIG. 17 is a flowchart of a tag ID configuration process. This process allows communications devices to receive their tag ID for use in the creation and transmission of tags.

Figure 18:
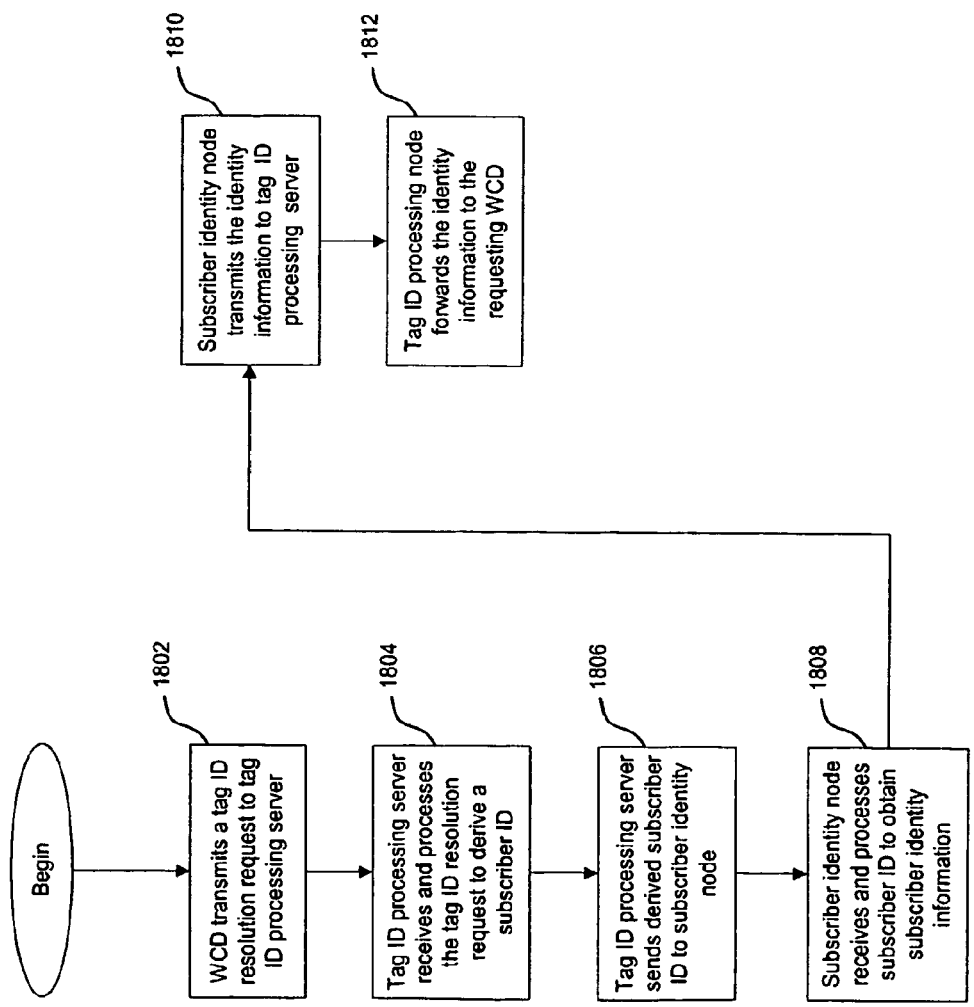

FIG. 18 is a flowchart of a tag identity resolution process. This process allows communications devices to determine subscriber IDs from tag IDs.

Figure 19:
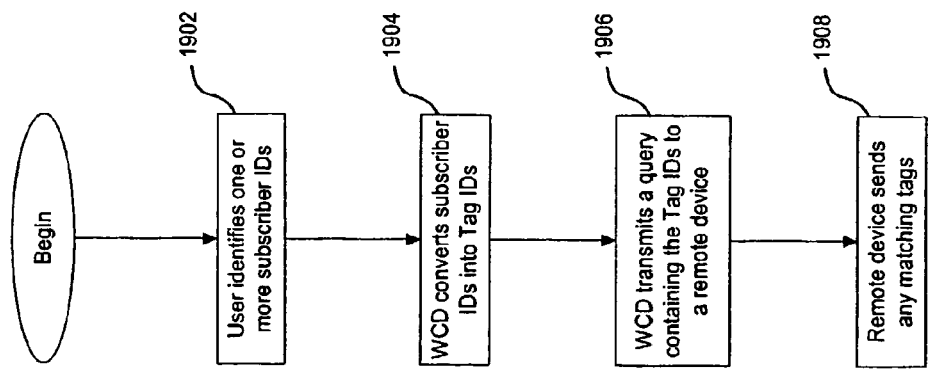

FIG. 19 is a flowchart illustrating the searching of tags. This may be performed at various devices, such as a virtual tag wall server.

Figure 20:
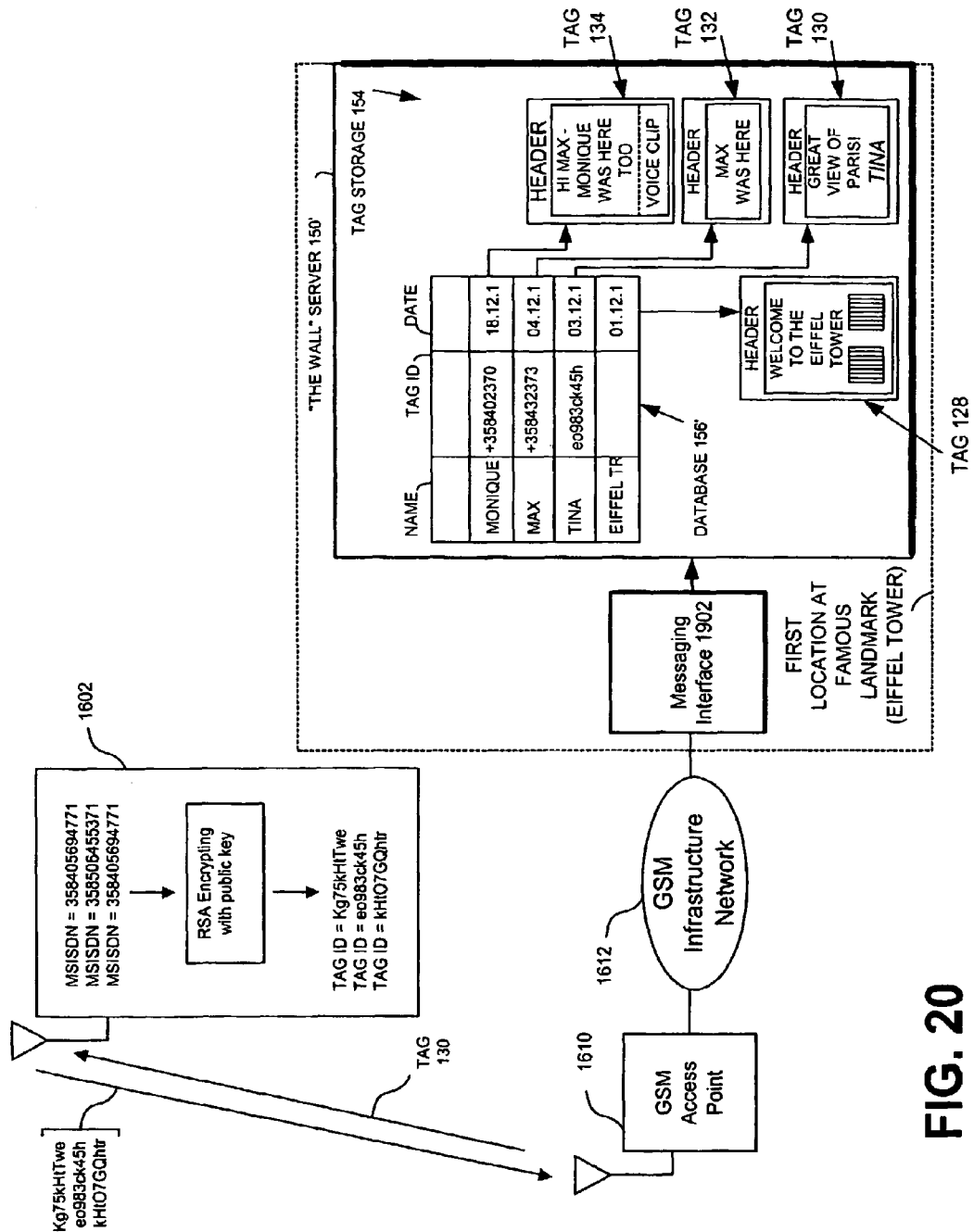

FIG. 20 is a diagram illustrating an example of tag searching. In this example, a communications device searches for tags contained at a wall server.

Figure 21:
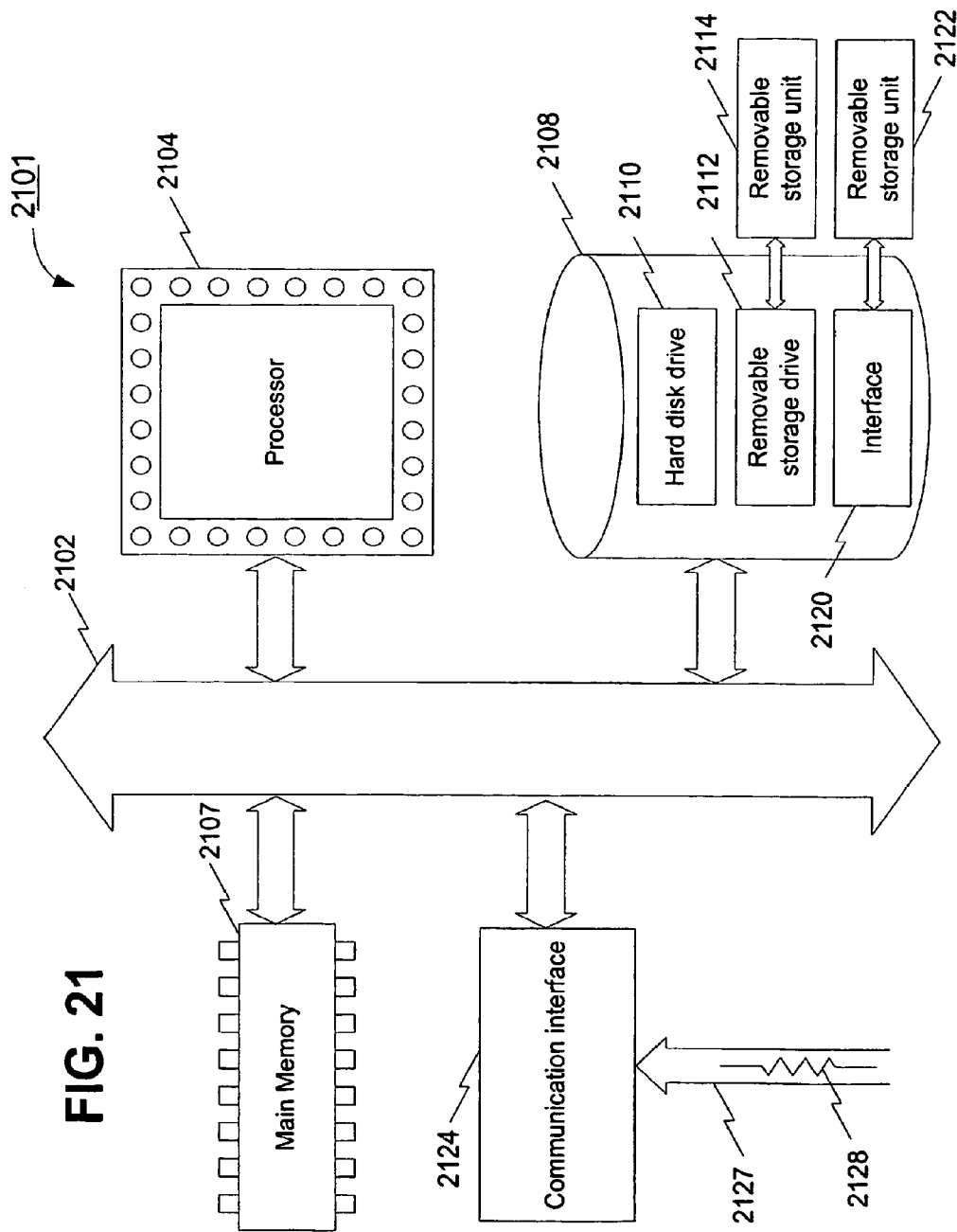

FIG. 21 is a block diagram of an exemplary computer system.

DETAILED DESCRIPTION OF THE PREFERRED EMBODIMENTS

I. Multimedia Tags

In the following description of the preferred embodiment, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

It is human nature to leave one's mark when visiting a place. Leaving one's mark can range from signing a guest book to spray-painting a wall. If a person had the possibility to leave an electronic tag commemorating the fact of their visit, such as to the Eiffel Tower, it is natural that they would do it. Leaving an electronic tag would be even more likely if it could be done inexpensively and easily with one's mobile phone. It would be an attractive feature to be able to commemorate one's visit to a famous place by leaving an electronic tag that would be retained at that place and be visible years later upon one's return. A person could write messages to be left for their friends to find, in the classic manner of leaving one's mark.

One aspect of the invention is a system and method to create an electronic tag, which is a personal multimedia message that can only be delivered within a personal area, such as within the range of a personal area network (PAN). The feature of personal area delivery emphasizes that the sender must physically be at a place, or be nearby a person receiving the electronic tag. An electronic tag can only be delivered from one person to another within the personal area. The preferred implementation of the invention is by communication with Bluetooth devices. The sender and the receiver must have their Bluetooth devices physically nearby each other in order to transfer the electronic tag. The invention can be implemented as a wireless personal area network (PAN) such as provided in Bluetooth Standard, Radio Frequency Identification (RFID), and Infrared Data Protocol networks (IrDA) or a wireless local area network (LAN) such as provided in the IEEE 802.11 Wireless LAN Standard and the HIPERLAN Standard.

Another aspect of the invention is "the wall" server, a storage device connected to a Bluetooth access point located at a place where people gather. An electronic tag containing a multimedia message can be published at a place, such as the Eiffel Tower, by the sender transmitting it over the Bluetooth link to "the wall" server. To publish in this manner, the sender must physically be there. Electronic tags that are published by uploading them in this manner to "the wall" server, can be browsed and downloaded by others using their Bluetooth devices.

In another aspect of the invention, a person having a Bluetooth equipped cellular telephone can publish his/her own content on places where people gather, and thus create circulating content. The multimedia messages contained in an electronic tag can be extracted and relayed over the cellular telephone network as a multimedia message. The best aphorisms, jokes, etc. from "the wall" server can be circulated. It is not the electronic tag, itself, that is transmitted over the cellular network, but the multimedia content of the tag. The electronic tag, itself, can only be transferred over a short-range wireless radio link, such as a Bluetooth link, to preserve the close proximity of the sender and the receiver.

The multimedia content of an electronic tag is the artistic expression of its creator. In another aspect of the invention, the electronic tag uniquely associates the creator's identity with the multimedia content by prohibiting alteration of the content after the user completes its creation. The electronic tag includes the creator's ID, such as his/her international mobile subscriber identity (IMSI) or mobile station integrated services digital network number (MSISDN). Subsequent viewers of the content can make a copy of the content and can then modify it, but they cannot authentically attribute the modified copy to the original user.

In another aspect of the invention, a hop count is contained in the electronic tag. Collectors will attribute greater value to those tags with a low hop count. For example, instead of collecting autographs, one collects electronic tags of famous people that he/she meets. A collector, upon meeting Tina Turner, receives her electronic tag with a hop count of one. The collector will attribute a high value to that tag. The low hop count indicates that the collector actually met Tina Turner. The collector can show the tag to friends. The hop count information indicates that the tag is an original "first generation tag". If the collector were to give away the tag to a friend, the collector looses the original tag, but retains a copy with an increased hop count. Alternately, if the collector delivers a copy of the tag to a friend, the friend receives the copy with an increased hop count, while the collector retains the original. These transfers of the tag can only occur over a short-range wireless radio link, such as a Bluetooth link, to preserve the close proximity of the sender and the receiver.

FIG. 1 illustrates a Bluetooth equipped cellular telephone 100 searching for tags in "the wall" server 150, using the tag author's name, IMSI or MSISDN identity, according to an embodiment of the present invention. The Bluetooth devices are in close proximity to one another and use the Bluetooth link to exchange tags. The mobile wireless device 100 of FIG. 1 is equipped with circuits 103 for short-range wireless systems and circuits 105 for cellular telephone communications systems. Cellular telephone communications systems include GSM, GPRS, UMTS, EDGE, and the like. An example of such a mobile wireless device 100 is a Bluetooth-equipped GSM cellular telephone.

During an initial period when the mobile wireless device 100 is within the coverage area of the short range wireless access point 140, it exchanges inquiry and paging packets and service discovery protocol (SDP) packets with the access point 140. In this example, the short-range wireless access point 140 is a Bluetooth access point and the short-range wireless circuits in the mobile wireless device 100 are Bluetooth circuits. The user has previously actuated the Bluetooth mode button "BT" on the keypad 104 and the Bluetooth circuits have completed their exchange of inquiry, paging, and service discovery packets with the Bluetooth access point 140.

In this example, the user wishes to search the tags on "the wall" server 150, using the tag author's name, IMSI or MSISDN identity, as taken from the old tags 107 and 109 stored in the tag buffer 245. Tag 107 includes the header 107" containing Max's ID, which is an IMSI or MSISDN identity, a hop count value of one, a content-originator flag (CFG) value of "true", a person-to-person flag (PFG) value of "true", a message authentication code (MAC) and Max's digital signature (SIG). Tag 107 also includes multimedia content 107'. The user wishes to search the tags on "the wall" server 150, using Max's IMSI identity.

Tag 109 includes a header containing Tina's ID, which is an IMSI or MSISDN identity, a hop count value of one, a content-originator flag (CFG) value of "true", a person-to-person flag (PFG) value of "true", a message authentication code (MAC) and Tina's digital signature (SIG). Tag 109 also includes multimedia content 109'. The user wishes to search the tags on "the wall" server 150, using Tina's IMSI identity. The user's device 100 extracts the IMSI identities from tags 107 and 109 and assembles a query that it sends over the Bluetooth link to the server 150. In this example the query terms represent Max's IMSI identity and Tina's IMSI identity.

The "wall server" 150 includes the tag storage 154 and the database storage 156. Tags 128, 130, 132, and 134 are currently in the tag storage 154, which is shown in FIG. 4. A user can browse tags 128, 130, 132, and 134 that have previously been "painted on the wall", using the tag selector 122 on the device 100 to view a list 124 downloaded from the server 150, listing the tags stored in the server. Since each of the tags 130, 132, and 134 has been uploaded to the server 150, each has a person-to-person flag (PFG) value of "false".

Alternately, the user can also perform a database search for tags using a query specifying particular IMSI or MSISDN values or user names. The database storage 156 in the server 150 includes database 158 that stores information about each tag in the server, in a tag record. The database 158 is shown in greater detail in FIG. 5. Each tag record includes fields for the information contained in the corresponding tag, to enable searches to be made on the author's name, IMSI or MSISDN identity, the hop count, the content-originator flag (CFG) value, the message authentication code (MAC) of the information in the tag, and the digital signature (SIG) of the author of the tag.

Additional fields in the tag record include a time stamp when the tag was recorded in the server 150 and comment chain linking pointers to other tags in the server 150. In an alternate embodiment, the tag record includes a field for the two dimensional X,Y coordinates of the location of the tag in a virtual viewing space. The comment chain linking field contains pointers linking the tags forward or backward, if they are part of a sequence of user comments that have been recorded on "the wall".

The tag storage 154 includes Tag 132, which includes Max's ID which is an IMSI or MSISDN identity. This data is contained in the personal ID field of a tag record in database 158 having a tag index field of "Tag 132". The tag storage 154 also includes Tag 130, which includes Tina's ID which is an IMSI or MSISDN identity. This data is contained in the personal ID field of a tag record in database 158 having a tag index field of "Tag 130". The user's query results in the return of a list 124, which is downloaded from the server 150, listing the tags stored in the server having the particular IMSI or MSISDN values or user names.

FIG. 1A illustrates the Bluetooth equipped cellular telephone downloading selected tags 130 and 132 from "the wall" server, according to an embodiment of the present invention. FIG. 1A shows Max's tag 132 downloaded to device 100 and stored in its tag buffer 245. Note that the hop count value has been incremented by one when the tag was downloaded from the server 150. Also note that the person-to-person flag (PFG) value is "false". The multimedia content 132' is shown on the screen 120 of the device 100.

Tina's tag 130 is downloaded to device 100 and stored in its tag buffer 245. Note that the hop count value has been incremented by one when the tag was downloaded from the server 150. Also note that the person-to-person flag (PFG) value is "false". The multimedia content 130' is also shown on the screen 120 of the device 100.

FIG. 1B illustrates the Bluetooth equipped cellular telephone downloading a selected tag 134 from "the wall" server, according to an embodiment of the present invention. The Bluetooth devices are in close proximity to one another and use the Bluetooth link to exchange tags. Tag 134 was found by using a forward link from the earlier tag 132, the forward link identifying the later tag 134 as part of a sequence of user comments that have been recorded on "the wall". The "comment chain link" field in database 158 contains pointers linking the tags forward or backward, if they are part of a sequence of user comments that have been recorded on "the wall". The row for Tag 132 includes a forward linking pointer "For_Link to Tag 134" to the row for Tag 134.

Referring to server tag storage 154 of FIG. 4 and the database 158 of FIG. 5, Tag 134 was uploaded by its author, Monique, with a time stamp of 18.12.01, wherein its author designated that Tag 134 was a comment on Max's earlier tag 132, having a time stamp of 04.12.01. The designation of tag 134 as being a comment about Tag 132, is stored as the forward linking pointer "For_Link to Tag 134" in the row for Tag 132. A corresponding backward linking pointer "Bak_Link to Tag 132" was written by the server in the row for Tag 134. FIG. 1B shows the wireless device 100 sending a query "GET Forward Linked Tags", which results in the database 156 accessing Monique's tag 134, which is downloaded to device 100 and stored in its tag buffer 245. Note that the hop count value in the header 134" has been incremented by one when the tag was downloaded from the server 150. Also note that the person-to-person flag (PFG) value is "false". The multimedia content 134' is shown on the screen 120 of the device 100.

FIG. 1C illustrates the editing buffer 247 in the Bluetooth equipped cellular telephone 100, wherein a multimedia content 138' is created and then incorporated into a tag 138, according to an embodiment of the present invention. A user can write text 250 in step (1), create a voice clip and append it to the text 250 and/or take a digital picture and compress it as a JPEG file 251 and append it to the text 250 in step (2), to create a multimedia file in step (3) as the content 138' of the tag 138. The creation or modifying of the multimedia content 138' can be done in the user's mobile wireless device 100 or off line and then stored in the mobile device 100.

The multimedia content 138' is then incorporated into the tag or it can be referenced by a pointer in the tag. In FIG. 1C, a copy 254 is made of a tag template in step (4), having a header portion 255 and a content portion 256. The header portion specifies a personal ID field, which is filled with the identity of the author, a hop count field with a default value of zero, a content-originator flag (CFG) field with a default value of "false", a person-to-person flag (PFG) field with a default value of "true", a MAC field and a digital signature (SIG) field.

The hop count always begins with a value of zero in the author's wireless device 100. The content-originator flag (CFG) field remains at a value of "false" during the period while the content portion 256 is being created or modified. The initial value of the person-to-person flag (PFG) is set to a value of "true". The person-to-person flag (PFG) value of "true" verifies that the tag has only been transferred from person-to-person, and has not been downloaded from "the wall" server. The MAC field and the digital signature (SIG) field are filled in, as described below.

When the completed multimedia content is inserted into the portion 256 of the tag and when all of the fields of the portion 255 are completed in step (5), the content-originator flag (CFG) field is set to "true" in step (6), thereby freezing the content of the tag 138. Subsequent viewers of the content can make a copy of the content and can then modify it, but they cannot authentically attribute the modified copy to the original user.

The multimedia content 138' can be in the form of a multimedia messaging service (MMS) message, which is described in the 3GPP Technical Specification entitled *Multimedia Messaging Service* (*MMS*) *Functional Description*, TS 23.140, V5.1.0 (2001-12).

An example of the values inserted into the MAC field and the digital signature (SIG) field of the tag 138 is as follows, using the principles of public key encryption. A hash value is computed on the concatenated multimedia content 138' and the author's personal ID field, forming the message authentication code (MAC). In this example, it is not necessary to store the unencrypted MAC in the MAC field. Instead, the MAC value and a clear text copy of the author's ID are encrypted using the author's secret key, to form a digital signature (SIG), which is written into the digital signature (SIG) field of tag 138. The MAC is effectively incorporated into the tag in its encrypted (i.e., signed) form as the digital signature.

Later, the author's wireless device 100 delivers a copy of the tag 138 over the Bluetooth link to a second wireless device. The second wireless device decrypts the signed MAC using the author's public key, recovering the clear text author's ID and also recovering the MAC. If the recovered author's ID is readable, then the recipient is certain that the author originated the recovered MAC value. Then, to insure that the multimedia content 138' has not been altered since it was created by the author, the second wireless device computes a reference MAC. The reference MAC is a hash value computed on the concatenated multimedia content 138' and author's personal ID, both of which have been provided by the tag 138. The second wireless device compares the recovered MAC with the reference MAC and if the two MAC values are equal, then the receiving party knows that the multimedia content 138' has not been modified since it left the author's wireless device 100.

In an alternate embodiment, the expression "content-originator flag (CFG)=true" can also be included in the MAC. In this embodiment, a hash value is computed in the author's device 100 on the concatenated multimedia content 138' and the expression "content-originator flag (CFG)=true", forming the message authentication code (MAC). Then, the second wireless device decrypts the signed MAC using the author's public key, recovering the clear text expression "content-originator flag (CFG)=true" and also recovering the MAC. If the recovered expression "content-originator flag (CFG)=true" is readable, then the recipient is certain that the author originated the recovered MAC value and that the author's wireless device had set the content-originator flag (CFG) value to "true".

Methods to generate and evaluate message authentication codes to insure the integrity of data are described in the book by Stephen Thomas entitled *SSL and TLS*, published by John Wiley and Sons, 2000. Two example algorithms for message authentication are RSA's Message Digest (MD5) and the Secure Hash Algorithm (SHA), both of which are described in the book by Stephen Thomas. Another reference that goes into greater detail in its discussion of data integrity methods is the book by Bruce Schneier entitled *Applied Cryptography— 2nd Edition* published by John Wiley and Sons, 1996. Methods to generate and evaluate digital signatures to authenticate the originating user as the source of the MAC (or other signed data), are described in the book by Richard E. Smith entitled *Internet Cryptography*, published by Addison Wesley, 1997.

The multimedia content 138' is artistic expression of its author and the tag 138 uniquely associates the author's identity with the multimedia content 138' by prohibiting alteration of the content after the author completes its creation or modification. Subsequent viewers of the content can make a copy of the content and can then modify it, but they cannot authentically attribute the modified copy to the original author.

When the original user has created the content in his/her mobile wireless device, a hop count value of zero is written into the tag. If the user uploads the tag to the server 150 and writes the tag on "the wall", the hop count is incremented by one. Whenever a later user downloads a copy of the tag from the server, the hop count is incremented again by one. When one user sends a copy of the tag over a Bluetooth link to another user, each transmission increments the hop count in the tag by one. This feature makes original copies of the content more valuable, as signified by a low hop count value in the tag.

A person-to-person flag (PFG) is also included in the tag. The initial value of the person-to-person flag (PFG) is set to a value of "true" when the originating user creates the tag. The person-to-person flag (PFG) value of "true" verifies that the tag has only been transferred from person-to-person, and has not been downloaded from "the wall" server. When the tag is uploaded to "the wall" server, the value of the person-to-person flag (PFG) is reset to a value of "false", and can never be returned to a value of "true". Thus, a tag directly received from a famous person, will have a person-to-person hop count of one, and thus be an item of value, similar to an original, famous autograph. As long as the tag is not transferred to "the wall" server, the person-to-person flag (PFG) value remains "true" and the tag has a greater value than it would if it had been obtained by downloading it from "the wall" server. Thus, a tag directly received from a famous person, will have a person-to-person hop count of one, and thus be an item of value, similar to an original, famous autograph. FIG. 1D illustrates the Bluetooth equipped cellular telephone uploading the tag 138 to "the wall" server, to "paint the wall", according to an embodiment of the present invention. The Bluetooth devices are in close proximity to one another and use the Bluetooth link to exchange tags.

In an alternate embodiment, when the user uploads a tag 138 to the server 150 and "paints the wall", the server will return the tag 128 that is a souvenir of visiting the location, such as "Welcome to the Eiffel Tower".

FIG. 1E illustrates the Bluetooth equipped cellular telephone 100 transferring the tag 134 to a second Bluetooth equipped cellular telephone 100', using the "tag delivery" mode, whereby the sending user transfers a copy of the tag 134 in the sender's device 100, causing the hop count to be incremented by one in the copy of the tag received by the recipient's device 100', according to an embodiment of the present invention. The Bluetooth devices are in close proximity to one another and use the Bluetooth link to exchange tags. If the user has a Bluetooth equipped cellular telephone 100, he/she can transmit the multimedia content 134' of a tag 134 over a cellular telephone network to a cellular telephones capable of receiving multimedia files. However, the tags, themselves, cannot be transmitted in any other manner than over a short-range wireless link, such as a Bluetooth link.

The user of a Bluetooth mobile device 100 must be close enough to another Bluetooth device 100' to directly communicate over the Bluetooth link in order to send a tag 134. The user must be at the location of the access point for the "wall" server 150 in order to "paint the wall" with his/her tag. The user must be at the location of his/her friend in order for his/her device 100 to deliver his/her tag to the friend's device 100'. This requirement of proximity between sender and receiver of a tag is imposed by the programmed operation of the Bluetooth devices, in accordance with the invention.

There are two modes that the user can select from to transfer his/her tag to a friend. The first mode is a "tag delivery", whereby the sending user transfers a copy of the tag in the sender's device, causing the hop count to be incremented by one in the copy of the tag received by the recipient. The second mode is called "tag give-away", whereby the sending user transfers the tag currently in the sender's device, causing the hop count to remain unchanged in the tag received by the recipient. The sender effectively keeps a copy of the tag, and the copy in the sender's device is incremented by one. The person-to-person flag (PFG) value of "false" indicates that the tag has been downloaded from "the wall" server at some point after it was created.

FIG. 1F illustrates the Bluetooth equipped cellular telephone 100 transferring the tag 134 to the second Bluetooth equipped cellular telephone 100', using the "tag give-away" mode, whereby the sending user transfers the tag currently in the sender's device, causing the hop count to remain unchanged in the tag received by the recipient, according to an embodiment of the present invention. The Bluetooth devices are in close proximity to one another and use the Bluetooth link to exchange tags. The sender effectively keeps a copy of the tag, and the copy in the sender's device is incremented by one.

FIG. 1G illustrates the Bluetooth equipped cellular telephone 100 transferring over the cellular telephone network, the multimedia content 134' to the second Bluetooth equipped cellular telephone 100', according to an embodiment of the present invention. The multimedia content 134' is extracted from the tag 134 in the user's device 100 and is transmitted via the GSM circuits 105 to the GSM access point 148 as a multimedia messaging service (MMS) message. The GSM access point 148 transfers the multimedia content 134' over the GSM infrastructure network 116 to the remote GSM access point 148', where it is transmitted to the second wireless device 100' via its GSM circuits 105. There the second wireless device 100' displays the multimedia content 134' on its browser 102 and stores it in its memory 202. FIG. 1H illustrates the Bluetooth equipped cellular telephone 100 transferring over the cellular telephone network 116, the multimedia content 134' to either a cell phone 117 or an Internet protocol gateway 118, the Internet 144, and the recipient's personal computer 119, according to an embodiment of the present invention.

FIG. 2 illustrates the memory and components of the Bluetooth equipped cellular telephone 100, according to an embodiment of the present invention. The memory 202 is connected by the bus 204 to the Bluetooth radio 206, the keypad 104, the central processor 210, the display 212, and the cellular telephone radio 208. The memory 202 stores programs that are sequences of executable instructions which, when executed in the central processor 210, carry out the methods of the invention. The memory 202 includes the Bluetooth transport group 214 that includes the link controller 216, the link manager 218, and the logical link control and adaptation layer 220. The memory 202 also includes the GSM protocol group 215, the HSCSD protocol group 217, and the GPRS protocol group 219. The memory 202 also includes the Bluetooth middleware protocol group 224 that includes the RFCOMM, PPP, IP, UDP, and SDP program modules.

The memory 202 further includes the application group 235 that includes the application programs 225. The application programs 225 include create a tag program 222, download a tag over Bluetooth program 223, deliver a tag to a friend over Bluetooth program 226, handle delivered tags received from friends program 228, write a multimedia note program 230, paint a tag with a note in a "wall" over Bluetooth program 232, search tags of friends from the "wall" over Bluetooth program 236, browse the "wall" over Bluetooth program 238, and relay multimedia content over GSM network program 240. The memory 202 also includes a display buffer 244, a GUI application 234, the editing buffer 247 (shown in FIG. 1C), the tag buffer 245 (shown in FIG. 1A), a wireless application protocol (WAP) module and a WAP application environment (WAE) module.

FIG. 2A is a flow diagram of the mobile wireless device communications processing method 500 in the applications programs 225 of the mobile wireless device 100. The steps in the flow diagram are as follows.

Step 502: Create new tag (FIG. 1C) or select tag from tag buffer (FIG. 1E, 1F, or 1G).

Step 504: Determine if the user has requested transmission over the short-range wireless link to step 505 or alternately over the cellular telephone link (FIG. 1G) to step 530.

Step 505: Determine if the user has requested transmission using the tag delivery mode (FIG. 1E) to step 506 or alternately, using the tag give away mode (FIG. 1F) to step 516.

Step 506: If the user has requested transmission using the tag delivery mode, then make a copy of the tag.

Step 508: increment hop count by one in the copy of the tag.

Step 510: Send the copy of the tag over the short-range wireless link.

Step 516: If the user has requested transmission using the tag give away mode, then make a copy of the tag.

Step 518: increment hop count by one in the original tag.

Step 520: Store and keep the copy of the tag with the incremented count.

Step 522: Send the original tag with the original count over the short-range wireless link.

Step 530: If the user has requested transmission over the cellular telephone link, then extract the multimedia content from the tag.

Step 532: Send only the multimedia content over the cellular telephone link.

FIG. 3 illustrates the memory and components of the "the wall" server 150, according to an embodiment of the present invention. The memory 302 is connected by the bus 304 to the Bluetooth access point 140, hard drive storage 306, the central processor 310, and the optional LAN adapter 308. The memory 302 stores programs, which are, sequences of executable instructions which, when executed in the central processor 310, carry out the methods of the invention. The memory 302 includes the operating system 316, the database manager system 318, the database storage 156 (shown in FIG. 5), the tag storage 154 (shown in FIG. 4), and the application programs 325. The application programs 325 include manage sending downloaded tag over Bluetooth program 323, manage receiving painted tag over Bluetooth program 332, manage searching tags over Bluetooth program 336, manage browsing over Bluetooth program 338, manage list view over Bluetooth program 340, and manage search options over Bluetooth program 342. The memory 302 also includes the I/O buffer 345.

FIG. 3A is a flow diagram of "the wall" server communications processing method 600 in the applications programs 325 of "the wall" server 150. The steps in the flow diagram are as follows.

Step 602: Receive an uploaded tag over the short-range wireless link (FIG. 1D or FIG. 7A).

Step 604: Set the person-to-person flag (PFG) to the value of "false".

Step 606: Store the tag in the tag storage (FIG. 4) and store the tag record for the tag in the database storage (FIG. 5).

Step 608: Determine if a request has been received for the tag over the short-range wireless link (FIG. 1):

Step 616: If a request has been received for the tag over the short-range wireless link, then make a copy of the tag.

Step 518: Increment hop count by one in the copy of the tag.

Step 510: Send the copy of the tag over the short-range wireless link (FIG. 1A or FIG. 7B).

FIG. 6A illustrates an alternate embodiment of the invention, with the Bluetooth equipped cellular telephone 100 browsing for tags in "the wall" server 150. The Bluetooth devices are in close proximity to one another and use the Bluetooth link to exchange tags. The server 150 is programmed to store the tags in association with two dimensional X,Y coordinates, in a virtual viewing space shown in FIG. 6B. Each tag is given a position in the coordinate system at the time it is uploaded and stored in the server 150. The X,Y coordinates of a tag are with respect to the origin of coordinates X,Y=X0,Y0. For example, the X,Y coordinates of the tag 134 are X,Y=X134,Y134 with respect to the origin of coordinates X,Y=X0,Y0. These coordinates are stored in the tag record 134 of the database 158 of FIG. 5. The X,Y coordinates of the screen 120 of the wireless device 100 of FIG. 6A are X,Y=X120,Y120 with respect to the origin of coordinates X,Y=X0,Y0. As the user browses tags that have been posted on "the wall" server, he appears to move the viewing area of the screen 120 with respect to the origin of coordinates X,Y=X0,Y0 by using up/down and left/right controls of the user's Bluetooth device. The screen's position coordinates X120,Y120 are incremented or decremented as the user presses the up/down and left/right controls, causing the viewing area to pass over and include those tags whose X,Y coordinates are within the viewing area of the screen. A user can browse tags that have been posted on "the wall", by using up/down and left/right controls of the user's Bluetooth device 100.

FIG. 7A illustrates Monique's Bluetooth equipped cellular telephone 100" uploading her tag 134 to "the wall" server 150, to "paint the wall" at a position X134,Y134 of the virtual viewing space shown in FIG. 6B, according to an embodiment of the present invention. Monique uploads her tag 134 on a first occurring day. Note that the person-to-person flag (PFG) has a value of "true" in Monique's wireless device 100". When the server 150 receives the tag 134, it resets the person-to-person flag (PFG) to a value of "false", indicating that the tag 134 has been uploaded to a "wall" server at some time in its life. The database 158 in the server 150 adds a tag record with a tag index for tag 134. The tag record includes Monique's name and IMSI or MSISDN identity value +358402370, the hop count=1, the content-originator flag (CFG) value=true, the message authentication code (MAC) of the information in the tag 134, and the digital signature of Monique. Additional fields in the tag record include a time stamp 18.12.01 when the tag was recorded in the server 150. The tag record includes a field for the two dimensional X,Y coordinates X134,Y134 of the location of the tag 134 in a virtual viewing space of FIG. 6B. Tag 134 is uploaded by its author, Monique, with a time stamp of 18.12.01, wherein Monique designates that Tag 134 is a comment on Max's earlier tag 132, having a time stamp of 04.12.01. The designation of tag 134 as being a comment about Tag 132, is stored as the forward linking pointer "For_Link to Tag 134" in the record for Tag 132. A corresponding backward linking pointer "Bak_Link to Tag 132" is written by the server in the record for Tag 134. FIG. 7B illustrates the user's Bluetooth equipped cellular telephone 100 downloading tag 134 from "the wall" server, on a later day 26.01.02, according to an embodiment of the present invention. Note that the hop count value has been incremented by one when the tag was downloaded from the server 150. Also note that the person-to-person flag (PFG) has a value of "false", indicating that the tag 134 has been downloaded from a "wall" server at some time in its life.

FIG. 8 illustrates another alternate embodiment of the invention, wherein payment is required before user's device 100 is allowed to upload a tag 138 to "paint the wall" of the server 150. The Bluetooth devices are in close proximity to one another and use the Bluetooth link to exchange tags. The Bluetooth equipped cellular telephone 100 sends an SMS charge authorizing message 402 over the GSM cellular telephone access point 148, GSM infrastructure network 116, and telephone interface 404 to an account charging server 406, authorizing the account to be charged. The account charging server 406 returns an SMS payment token 408 over the cellular telephone network to the user's device 100.

FIG. 9 illustrates another alternate embodiment of the invention, wherein payment is required before a user is allowed to download a tag 134 from the "the wall" server 150. The Bluetooth devices are in close proximity to one another and use the Bluetooth link to exchange tags. A digital rights management (DRM) authorization message 420 is prepared in the DRM module 450 in the user's device 100 and is sent by the user's device over the Bluetooth link to "the wall" server 150. A DRM module 422 in the server 150 is connected over a network such as the Internet 144, to a DRM account charging server 424. The DRM account charging server 424 handles the necessary steps in debiting the user's account, and then returns an enabling signal to "the wall" server 150.

The digital rights management (DRM) module 422 in "the wall" server 150 creates a secure environment in the memory 302 of the server 150, within which the data rights information associated with the tag 134 can be securely written in the "DRM Data" field of the tag 134. The digital rights management (DRM) module 422 in "the wall" server 150 enters the "Paid" status and additional data rights information in the "DRM Data" field of the tag 134. The multimedia content 134' can optionally be encrypted by the module 422. "The wall" server 150 then downloads the tag over the Bluetooth link as requested by the user's device 100. The DRM module 450 in the user's device 100 creates a secure environment in the memory 202 of the device 100, within which the data rights associated with the tag 134 can be implemented.

The DRM data in the tag 134 read by the DRM module 450, includes rules imposed by its author, Monique, regarding how the tag 134 may be distributed. The rules can include restrictions on copying, transfer, payment for copies, time span allowed for distribution, conditions for distribution of trial samples, allocation of royalties to middleman distributors, and the like. If multimedia content 134' was optionally encrypted by the server 150, then the DRM module 450 in the user's device 100 decrypts the multimedia content 134' and permits its display on the screen 120. Additional description of the principles of digital rights management (DRM) can be found in the book by Bill Rosenblatt, et al., entitled *Digital Rights Management: Business and Technology*, published by Professional Mindware, 2001.

FIG. 10 illustrates another alternate embodiment of the invention, wherein payment is required before a user is allowed to download a tag from the "the wall" server 150. The Bluetooth devices are in close proximity to one another and use the Bluetooth link to exchange tags. A payment accumulator 430 is included in the user's device 100, that accumulates authorized charges in a register 432 for downloading a plurality of tags from one or from many "wall" servers 150, etc. over an extended period, such as a month. At the end of the month, the Bluetooth equipped cellular telephone 100 sends an SMS message 408 containing the monthly total authorized charges, sending it over the cellular telephone system 148, 116, and 404 to an account charging server 406, authorizing the user's account to be charged.

FIG. 11 illustrates another alternate embodiment of the invention, wherein "the wall" server 150 is connected over a LAN 440 to a remote, backup server 442 that stores a copy of all of the tags 128, 130, 132, and 134 and the database 156/158, to be used in the event of disaster recovery. Additionally, the backup server 442 provides an accessible, bulk storage for older tags, to reduce the storage requirements on "the wall" server 150.

FIG. 12 illustrates another alternate embodiment of the invention, wherein payment is required from Max's requesting device 100', before the providing user's device 100 will transfer a tag 134 to Max's requesting device 100'. The Bluetooth devices are in close proximity to one another and use the Bluetooth link to exchange tags. A digital rights management (DRM) module 450 in the user's mobile wireless device 100 and DRM module 450' in Max's mobile wireless device 100' handle the exchange of charge authorization messages over the Bluetooth link between the mobile devices. The DRM module 450' in Max's requestor's device 100' sends a charge authorizing message to the user's provider device 100. The user's provider device 100 then sends the tag 134 requested by Max's requestor's device 100', over the Bluetooth link. The digital rights management (DRM) module 450 in the user's wireless device 100 creates a secure environment in the memory 202 of the device 100, within which the data rights information associated with the tag 134 can be securely written in the "DRM Data" field of the tag 134. The DRM module 450 in the user's wireless device 100 enters the "Paid" status and additional data rights information in the "DRM Data" field of the tag 134. The multimedia content 134' can optionally be encrypted by the module 450. The user's wireless device 100 and then sends the tag 134 over the Bluetooth link in the tag delivery mode as requested by Max's wireless device 100'. The DRM module 450' in Max's device 100' creates a secure environment in the memory 202 of the device 100', within which the data rights associated with the tag 134 can be implemented. The DRM data in the tag 134 read by the DRM module 450', includes rules imposed by its author, Monique, regarding how the tag 134 may be distributed. The rules can include restrictions on copying, transfer, payment for copies, time span allowed for distribution, conditions for distribution of trial samples, allocation of royalties to middleman distributors, and the like. If multimedia content 134' was optionally encrypted by the user's wireless device 100, then the DRM module 450' in Max's device 100' decrypts the multimedia content 134' and permits its display on Max's screen 120.

Note that in the example of FIG. 12, it is assumed that there has never been an uploading of the tag 134 to a "wall server". This circumstance is indicated by the person-to-person flag (PFG), which has a value of "true" in the user's wireless device 100. The person-to-person flag (PFG) value of "true" verifies that the tag has only been transferred from person-to-person, and has not been downloaded from "the wall" server. The operation of tag delivery from the user's device 100 to Max's device 100' does not change the person-to-person flag (PFG), which has a value of "true" in the Max's wireless device 100'.

In another alternate embodiment of the invention, a tag can be automatically transferred from one Bluetooth device to another, whether stationary or mobile. The user's mobile Bluetooth device 100 can be programmed to listen or scan for any Bluetooth access point device 140 connected to a "wall" server 150. The SDP message exchange will tell the mobile device 100 of the availability of "the wall" services. When the user's mobile device 100 recognizes "a wall" server 150 within communications range, the user's mobile device 100 uploads the user's tag and automatically "paints the wall". The user's mobile device 100 can be programmed to automatically send a tag to any other Bluetooth device, including mobile devices such as 100'. A "tag worm" can be created, wherein the tag automatically propagates from user device 100 to user device 100', as users walk about. A user can prevent receiving unsolicited tags by turning off this feature.

In another alternate embodiment of the invention, a tag can be transferred from the user's mobile device 100 to a "wall" server 150 located in the user's home, as a "personal or family tag storage". The personal home "wall" server 150 is programmed to check the MSISDN identity of the mobile device 100 storing the tags. The user can store and retrieve his/her tags from the personal home "wall" server 150 without changing the hop counts in the tags. If an unauthorized person or device 100' were to attempt retrieving the user's tags, the personal home "wall" server 150 can prevent downloading the tags, or alternately it can increment the hop counts in copies of the tags that are downloaded.

In another alternate embodiment of the invention, "the wall" server 150 includes a queuing management system as one of the application programs 325 in FIG. 3. In this embodiment, the short-range wireless access point 140 for "the Wall" server 150 is located within the premises of a business. The queuing management system program of "the wall" server 150 performs the function of establishing a queue of customers waiting for service, such as in a bank or at a funfair or the like. The customer sends his/her Tag similar to Tag 138 shown in FIG. 1D (including his/her presence/ID-information) to "the Wall" server 150. "The wall" server 150 registers the customer as being on a virtual queuing line established by the queuing management system program. When the customer uploads his/her tag to the server 150, the server 150 can optionally return the tag 128 that is an advertisement message of the business, such as "Welcome to First National Bank. Open an interest-free checking account today." After registering, the customer can optionally browse other tags from "the Wall" server as shown in FIG. 1, while awaiting his/her turn within the premises of the business. Alternately, the customer can leave the premises of the business and when his/her turn is reached on the virtual queue, the queuing management system program of "the Wall" server 150 sends a notification message informing the customer that it is his/her turn at the front of the queue. The notification message can be sent over a cellular telephone network connected to "the wall" server 150, such as the network 116 in FIG. 8, to deliver an SMS message, similar to SMS message 408 shown in FIG. 8. Alternately, the notification message can be transmitted over a LAN such as the LAN 440 connected to "the wall" server 150 in FIG. 11, and delivered over a Bluetooth link to the customer's device 100 by a nearby Bluetooth access point connected to the LAN.

The resulting invention can be implemented in any suitable short range wireless system, including wireless personal area networks (PANs), such as Bluetooth networks, Radio Frequency Identification (RFID), and Infrared Data Protocol networks (IrDA), and wireless local area networks (LANs), such as the IEEE 802.11 wireless LANs and HIPERLAN networks.

I. II. Messaging Tags

FIGS. 1-12 involve short-range communications networks, such as Bluetooth. However, tags may be exchanged in other environments, as well. For instance, tags may be exchanged in environments where close physical proximity between devices is not required for communications. For example, messaging services, such as the Multimedia Messaging Service (MMS), may be employed to exchange tags across networks. These networks may involve various wireless technologies. For example, such tags may be exchanged across cellular telecommunications infrastructure.

Multimedia messaging service (MMS). provides automatic and immediate delivery of personal messages. MMS is similar in nature to short messaging service (SMS). However, unlike SMS, MMS provides for mobile phone users to enhance their messages by incorporating sound, images, and other rich content. This allows for the exchange of personalized visual and audio messages. In addition to broadening message content, MMS technology allows for flexibility in the source and destination of MMS messages. For instance, in addition to sending MMS messages from one phone to another, MMS messages may also be sent from phone to email, and vice versa. Another feature of MMS is that the message is a multimedia presentation in a single entry, not a text file with attachments. This makes MMS a simple and user-friendly way to exchange multimedia content. Information regarding MMS can be downloaded from the following sites on the Internet: http:/www.nokia.com/mms/index.html; and http:www.mobileMMS.com.

An MMS message is not sent directly from the sender to the recipient. Rather, it is sent to a multimedia service center (MMSC), which locates the recipient and delivers the message to the recipient (after sending an SMS notification and receiving a request for the message). Thus MMS can provide connectionless messaging communications.

Embodiments of the present invention employ message tags that are exchanged according to a messaging service, such as MMS. However, instead of being in conventional message formats (e.g., a standard MMS format), these message tags have formats that are detectable by communications devices, such as cellular telephones. Upon detection of a message tag, these devices can process and transmit the tag according various rules, and restrictions regarding the transfer of tags. An exemplary message tag format is shown in FIG. 13.

FIG. 13 is a diagram illustrating the format of an exemplary multimedia content tag 1300. As shown in FIG. 13, multimedia content tag 1300 includes a message portion 1302, and a header portion 1304 that is appended to message portion 1302. Message portion 1302 is a multimedia message, such as an MMS message. Accordingly, message portion 1302 may include content 1303, such as images, text, voice, audio, and/or other types of content.

Header portion 1304 includes various fields. In particular, FIG. 13 shows that header portion 1304 includes a tag flag 1310, a tag ID 1312, a hop count 1314, and a person-to-person flag (PFG) 1316.

Tag Flag 1310 may have either a "true" or a "false" value. A "true" value indicates that multimedia content tag 1300 is not a conventional multimedia content message, but a multimedia message tag. Accordingly, when a communications device receives a multimedia message (e.g., an MMS message), it identifies the message as a multimedia content tag if it has a header portion 1304 that includes a tag flag 1310 value of "true". At this point, the communications device may process and transmit the tag according to rules and conditions associated with the transfer of tags.

Tag ID 1312 indicates the originator of MMS tag 1300. Thus, Tag ID 1312 is a universal identity code for a subscriber that distributes tags. This field may be based on an MSISDN or an encrypted MSISDN associated with the originator. In further embodiments, tag ID 1312 may be baesd on other subscriber related identifiers, such as IMSIs, e-mail addresses, and Internet Protocol (IP) addresses.

Hop count 1314, indicates the number of times that tag 1300 has been delivered (also referred to herein as "hugged") since it was originated by its initiator. As described above, a hop count 1314 value of zero is written into the tag when the original user has created the content in his/her device. If the user uploads the tag to the server and writes the tag on "the wall", hop count 1314 is incremented by one. Whenever a later user downloads a copy of the tag from the server, hop count 1314 is incremented again by one. When one user sends a copy of the tag to another user, each transmission increments hop count 1314 in the tag by one. This feature makes original copies of the content more valuable, as signified by a low hop count value in the tag.

Person-to-Person Flag (PFG) 1316 indicates whether tag 1300 has ever been publicly available. For example, PFG Flag 1316 indicates whether tag 1300 has been published on a virtual tag wall (such as wall server 150) or similar entity. As described above, the initial value of PFG flag 1316 is set to a value of "true" when the originating user creates the tag. This value of "true" verifies that the tag has only been transferred from person-to-person, and has not been downloaded from a virtual tag wall. When the tag is uploaded to a virtual tag wall, the value of PFG flag 1316 is reset to a value of "false", and can never be returned to a value of "true". Thus, a tag directly received from a famous person will have a person-to-person hop count of one, and thus be an item of value, similar to an original, famous autograph. As long as the tag is not transferred to a virtual tag wall, the value of person-to-person PFG flag 1316 remains "true" and the tag has a greater value than it would if it had been obtained by downloading it from a virtual tag wall.

As an alternative to the format shown in FIG. 13, the information of header portion 1304 may instead be embedded inside a standard MMS structure as an internal header. This internal header can be a portion within a standard message. For example, inside an MMS message, there can be additional fields that are the internal header. Such internal headers may be implemented like normal text input by users, but interpreted by communications devices as a tag header.

According to one embodiment of the present invention, parts of the multimedia content tag, such as one or more fields of header portion 1304 may be encrypted during transmission and storage within communications devices. These encrypted parts may be decrypted for various tag processing operations performed by the communications devices.

For example, when a tag is created, a value is assigned to its tag ID field. The value of this field cannot be changed later on. Instead, a recipient of the tag may copy its MMS into a newly created tag, and assign a different value to the tag ID field of the new tag.

In addition, different transfer modes may be employed, such as the aforementioned tag delivery and tag give-away modes. These transfer modes affect the manner in which a tag's hop count field is incremented.

For instance, in the aforementioned tag delivery mode, a sending user transfers a copy of the tag in the sender's device, causing the hop count to be incremented by one in the copy of the tag received by the recipient. In the "tag give-away" mode, the sending user transfers the tag currently in his/her device, causing the hop count to remain unchanged in the tag received by the recipient. Thus, the sender effectively keeps a copy of the tag having a hop count that is incremented by one.

By incrementing a tag's hop count during its distribution, the percentage of tags having small hop count values become rare. Thus, a tag having a small hop count indicates that its possessor is familiar with the tag's originator.

Further conditions (restrictions) may be imposed on the transfer of tags. For example, in a cellular communications environment, tag transfer may only be allowed between users that are inside the same network cell. In other words, the exchange of tags between users within different cells would not be enabled.

FIG. 14 is a flowchart illustrating the processing of a multimedia messaging tag by a wireless communications device (WCD), such as a cellular telephone. The following description of these steps is made with reference to the format of multimedia content tag 1300. However, this process may be employed with other tags in various formats.

FIG. 14 shows that there are various ways in which tag processing operations may commence. Steps 1401, 1402, and 1403 illustrate three such ways.

In step 1401, the user of the WCD creates a new multimedia message tag. However, in step 1402, the user of the WCD selects a tag from the tag buffer within the WCD. As shown in FIG. 14, a step 1408 follows each of steps 1401 and 1402.

In step 1403, the WCD receives multimedia content message from a wireless communications network, such as a GSM cellular network. A step 1404 follows step 1403. In this step the WCD determines whether the received message contains a tag flag 1310 having a value of "true". If not, then operation proceeds to step 1406, where the wireless communications device engages in normal multimedia message processing. However, if the received multimedia message contains a Tag Flag 1310, then operation proceeds to step 1408.

In step 1408, the WCD determines a mode in which the tag is to be sent. For instance, this step comprises determining whether the tag is sent according to a tag delivery mode or a tag give away mode. This step may comprise the user of the WCD interacting with a user interface to designate the transmission mode. For example, step 1408 may comprise the WCD displaying a menu providing a selection of tag send modes. The user would then select one of the displayed modes.

Next, in a step 1410, the WCD decrypts the multimedia content tag 1300. At this point, the WCD is able to change the content of fields included in header portion 1304, such as hop count 1314 and PFG flag 1316.

In a step 1412, the WCD changes the contents of one or more fields in header portion 1304.

A step 1414 follows step 1412. In this step, the WCD encrypts the one or more fields of header portion 1304.

Next, in a step 1416, the WCD sends the multimedia content tag to its destination.

II. Encryption

As described above, each tag includes a tag ID, which is a universal identity code for the subscriber (user) who distributed the tag. Thus, when a tag is sent to a destination, such as a user's communication device or a virtual tag wall, its tag ID can be used to identify the person who originated the tag. Accordingly, strategies for searching tags transmitted by certain people may be based on tag IDs. For example, at virtual tag walls, a user (subscriber) can search for the tags of particular individuals, if the user knows the Tag IDs that correspond to these individuals.

These tag IDs may be based on subscriber network IDs (e.g., MSISDNs or IMSIs). For instance, tag IDs may be assigned the network IDs of the originating subscribers. Such assignment schemes are convenient for establishing a universal tagging identity, because they associate tag IDs to numbers established by a cellular operator.

However, the employment of such ID numbers may create security issues. This is because, in order to distribute tags, users are required to make their subscriber IDs (i.e., their telephone numbers) publicly available. This requirement may reduce people's willingness to send tags to locations that they visit (i.e., virtual walls), or transfer tags to people that they meet.

The present invention provides techniques that eliminate such security issues, while maintaining an association between network subscriber IDs and tag IDs. In addition, the present invention also provides secure techniques for determining the identity of a tag's originator.

For example, instead of making a subscriber's network ID (e.g., an MSISDN) publicly available as the tag IDs, an asymmetrically encrypted version of the subscriber's network ID is used. This encryption is done based on a public encryption key. This public key may be distributed among communications devices. Alternatively, this public key may be kept only within a secure trusted domain. A corresponding private key is used for decrypting tag IDs into network subscriber IDs. In embodiments, this private key is kept within a secure trusted domain, and is never published outside of the trusted domain.

The public encryption key allows users to derive tag IDs from network IDs that they are aware of. However, by maintaining the corresponding private key in secret, a user cannot derive network IDs from tag IDs without authorization from the trusted domain.

FIGS. 15A and 15B are diagrams that illustrate relationships between a subscriber ID 1502 and its corresponding tag ID 1504. In these relationships, both a public encryption key and a private encryption key are associated with an asymmetric encryption algorithm 1510. FIG. 15A shows that the public encryption key may be used to derive the tag ID from the subscriber ID. Conversely, FIG. 15B shows that the private encryption key may be used to derive the subscriber ID from the tag ID.

Asymmetric encryption algorithm 1510 may employ various encryption techniques. One such technique is RSA encryption. RSA encryption is a public-key encryption technology developed by RSA Data Security, Inc. The acronym stands for Rivest, Shamir, and Adelman. The RSA algorithm is based on the fact that there is no efficient way to factor very large numbers. Therefore, deducing an RSA key, would require an extraordinary amount of computer processing power and time. Many software products utilize RSA encryption.

FIG. 16 is a block diagram of an operational environment that includes a wireless communications device (e.g., a cellular telephone) 1602, a trusted domain 1604, a wireless communications network 1606, a packet-based network 1607, and a subscriber identification node 1608.

WCD 1602 may be implemented in a manner that is similar to wireless device 100. However, as an alternative to exchanging tags across short-range wireless communications links, WCD 1602, may exchange tags across other types of links, such as cellular communications links.

Wireless communications network 1606 is illustrated as a GSM network comprising GSM access point 1610, a GSM infrastructure network 1612, and a gateway 1614. As shown in FIG. 16 network 1612 is coupled between access point 1610 and gateway 1614. Gateway 1614 converts between transmission formats used in communications network 1606 and packet-based network 1607. Although FIG. 16 shows a particular GSM implementation for communications network 1606, other implementations are within the scope of the present invention.

Packet-based network 1607 is a network, such as the Internet, that provides for the exchange of packets according to one or more protocols. Examples of such protocols include the Internet Protocol (IP), and the Transmission Control Protocol (TCP).

Trusted domain 1604 includes a tag ID processing server 1616. As shown in FIG. 16, server 1616 is coupled to gateway 1614 by network 1607. This allows information to be exchanged between WCD 1602 in the form of requests and responses. Tag ID processing server 1616 provides tag ID configuration services and tag ID resolution services to devices, such as WCD 1602. Tag ID configuration services enable a subscriber to obtain a tag ID for use in tags that it may create and/or transmit. Such a tag ID may be based on subscriber identification information, such as an MSISDN or an IMSI.

Tag ID resolution services provide mappings from Tag IDs to corresponding subscriber identity information (e.g., a subscriber's name). This feature advantageously enables subscribers to ascertain the source of information. For example, if a subscriber receives a multimedia content tag that includes an autographed image of a celebrity, the subscriber may determine whether the tag was actually originated by the celebrity. To determine this, the subscriber can send the tag ID of the received tag to server 1616 for identity resolution. In response, server 1616 will respond with information that identifies the subscriber that transmitted the tag. If this subscriber is the celebrity, then the tag can be considered an authentic autograph. However, if the subscriber is someone else, then the tag can be viewed as an unauthentic autograph of lesser intrinsic value.

Tag ID processing server 1616 operates in a trusted domain 1606. Trusted domain 1606 allows the services that are provided by tag ID processing server 1616 to be accessible only to authorized subscribers. Accordingly, trusted domain 1606 may be implemented through authentication techniques that control which subscribers have access to information and services provided by, for example, server 1616.

An example of such authentication techniques include requiring a password from WCD 1602 to verify that its user is authorized to utilize the services of server 1616. Transmissions involving this password may be encrypted. Such authentication may be provided by server 1616, or a separate authentication server (not shown) within trusted domain 1606. This encryption may be based on a key provided, for example, by either server 1616 or the separate authentication server.

As shown in FIG. 16, subscriber identification node 1608 is coupled to tag ID processing server 1616 by network 1607. However, in alternative embodiments, these elements may be coupled by other means. Node 1608 may include one or more telephony databases 1609 that store subscriber-related information. For example identification node 1608 may include a telecommunications operators 118 service which identifies the person associated with an subscriber ID, such as an MSISDN.

FIGS. 17-18 illustrate processes involving the operational environment of FIG. 16. In particular, FIG. 17 shows a tag ID configuration process that allows communications devices to receive their tag ID for use in the creation and transmission of tags. FIG. 18 shows a tag identity resolution process that allows communications devices to determine subscriber IDs from tag IDs. Although FIGS. 17-18 are described with reference to the environment of FIG. 16, these processes may also be performed in other environments.

The process shown in FIG. 17 begins with a step 1702. In this step, WCD 1602 transmits a configure tag ID request to server 1616 within trusted domain 1606. This message includes an identification number associated with the user (subscriber) of WCD 102, such as an MSISDN or an IMSI.

Next, in a step 1704, tag ID processing server 1616 receives and processes the configure tag ID request. This processing results in a tag ID being derived from the identification number included in the configure tag ID request. As shown in FIG. 17, step 1704 includes using an asymmetric encryption algorithm (e.g., RSA) and a public key to encrypt this identification number. Since server 1616 is within trusted domain 1604, step 1704 may also include engaging in an authentication procedure with WCD 1602 to ensure that the user of WCD 1602 is authorized to utilize the services of processing server 1616.

A step 1706 follows step 1704. In step 1706, tag ID processing server 1616 sends a tag ID configuration message. This message includes the tag ID generated in step 1704. Next in step 1708, WCD 1602 may automatically insert this tag ID into tags that it creates and transmits.

The process of FIG. 17 involves the exchange of messages between WCD 1602 and tag ID processing server 1616. These messages may be in various formats. For example, these messages may be SMS messages.

As an alternative to the process shown in FIG. 17, WCD 1602 may independently derive a tag ID from subscriber-related identification numbers. To perform this operation, WCD 1602 possesses the public key and functionality to perform the asymmetric encryption algorithm described above. This functionality may be implemented with hardware, software, firmware, or any combination thereof. WCD 1602 may store the public key in memory such as RAM. In such implementations, WCD 1602 may receive the public key from server 1616 in response to a key request that it transmits.

FIG. 18 is a diagram illustrating a tag identity resolution process. In this process, the user of WCD 1602 desires to know a tag originator's identity, such as his name. This process begins with a step 1802, in which WCD 1602 sends a tag ID resolution request to tag ID processing server 1616 within trusted domain 1606.

Next, in a step 1804, tag ID processing server 1616 receives and processes the tag ID resolution request. This processing results in a subscriber related identification number (e.g., MSISDN or IMSI) being derived from the tag ID included in the configure tag ID message. As shown in FIG. 18, step 1704 includes using an asymmetric encryption algorithm (e.g., RSA) and a private key to decrypt this identification number. Since server 1616 is within trusted domain 1604, step 1804 may also include engaging in an authentication procedure with WCD 1602 to ensure that the user of WCD 1602 is authorized to utilize the services of processing server 1616.

A step 1806 follows step 1804. In this step, the identification number derived in step 1804 is transmitted to subscriber identity node 1608. In a step 1808, subscriber identity node 1608 receives and processes this identification number. This processing may include obtaining subscriber identity information (e.g., a subscriber's name) that is associated with this identification number.

Next, in a step 1810, this subscriber identity information is transmitted to tag ID processing server 1616. In a step 1812, this subscriber identity information is forwarded to WCD 1602 across wireless communications network 1606.

FIG. 19 is a flowchart illustrating the searching of tags according to embodiments of the present invention.

In a step 1902, the user of WCD 1602 identifies one or more subscriber IDs. These subscriber IDs may selected, for example, from a personal phonelist, or a published phone directory.

In a step 1904, WCD converts these subscriber IDs into corresponding tag IDs. This step comprises using a designated asymmetric encryption algorithm and a designated public key to derive tag IDs from subscriber IDs. Accordingly, this step 1904 may comprise performing the tag ID configuration process described above with reference to FIG. 17. Alternatively, in embodiments, where WCD 1602 possesses the public key and the asymmetric encryption algorithm, step 1904 may comprise WCD 1602 converting these subscriber IDs into Tag IDs itself.

A step 1906 follows step 1904. In step 1906, WCD 1602 transmits a query containing the one or more derived tag IDs to a remote device, such as a virtual tag wall. In a step 1908, the remote device sends any tag(s) containing tag ID fields that match the one or more tag IDs sent in step 1906.

FIG. 20 is a diagram illustrating a tag searching example. In this example, WCD 1602 searches for tags contained at a wall server 150'. Wall server 150' is similar to wall server 150, as described above. However, wall server 150' includes a messaging interface 2002 that provides for the exchange of messaging tags, such as MMS tags. Moreover, instead of including a database 156, which contains entries having personal IDs (e.g., IMSI or MISDN), wall server 150' includes a database 156'. Database 156' contains entries that are indexed according to tag IDs that are encrypted according to the techniques described herein.

As shown in FIG. 20, WCD 1602 searches for tags associated with three different MSISDN numbers: 358405694771, 358506455371, and 358405694771. These MSISDNs are encrypted with the public key to obtain the corresponding tag IDs: Kg75kHtTwe, eo983ck45h, and kHtO7GQhtr.

These tag IDs are sent in a query to wall server 150'. Upon receipt of this query, wall server 150' searches database 156' for the tag IDs contained in the query. As shown in FIG. 20, a match is found in tag 130. Accordingly, tag 130 is transmitted to WCD 1602 according to the tag transfer techniques described herein.

The example of FIG. 20 shows that subscriber ID numbers (e.g., MSISDNs) associated with the search never left WCD 1602. This feature advantageously provides enhanced security and privacy.

III. Computer System

Various elements described herein, such as tag ID processing server 1616, subscriber identification node, and server 150', may implemented with one or more computer systems. An example of a computer system 2101 is shown in FIG. 21. Computer system 2101 represents any single or multi-processor computer. Single-threaded and multi-threaded computers can be used. Unified or distributed memory systems can be used.

Computer system 2101 includes one or more processors, such as processor 2104. One or more processors 2104 can execute software implementing processes, such as the ones described above with reference to FIGS. 17, 18, and 19. Each processor 2104 is connected to a communication infrastructure 2102 (for example, a communications bus, cross-bar, or network). Various software embodiments are described in terms of this exemplary computer system. After reading this description, it will become apparent to a person skilled in the relevant art how to implement the invention using other computer systems and/or computer architectures.

Computer system 2101 also includes a main memory 2107 which is preferably random access memory (RAM). Computer system 2101 may also include a secondary memory 2108. Secondary memory 2108 may include, for example, a hard disk drive 2110 and/or a removable storage drive 2112, representing a floppy disk drive, a magnetic tape drive, an optical disk drive, etc. Removable storage drive 2112 reads from and/or writes to a removable storage unit 2114 in a well known manner. Removable storage unit 2114 represents a floppy disk, magnetic tape, optical disk, etc., which is read by and written to by removable storage drive 2112. As will be appreciated, the removable storage unit 2114 includes a computer usable storage medium having stored therein computer software and/or data.

In alternative embodiments, secondary memory 2108 may include other similar means for allowing computer programs or other instructions to be loaded into computer system 740. Such means can include, for example, a removable storage unit 2122 and an interface 2120. Examples can include a program cartridge and cartridge interface (such as that found in video game devices), a removable memory chip (such as an EPROM, or PROM) and associated socket, and other removable storage units 2122 and interfaces 2120 which allow software and data to be transferred from the removable storage unit 2122 to computer system 2101.

Computer system 2101 may also include a communications interface 2124. Communications interface 2124 allows software and data to be transferred between computer system 2101 and external devices via communications path 2127. Examples of communications interface 2127 include a modem, a network interface (such as Ethernet card), a communications port, etc. Software and data transferred via communications interface 2127 are in the form of signals 2128 which can be electronic, electromagnetic, optical or other signals capable of being received by communications interface 2124, via communications path 2127. Note that communications interface 2124 provides a means by which computer system 2101 can interface to a network such as the Internet.

The present invention can be implemented using software running (that is, executing) in an environment similar to that described above with respect to FIG. 21. In this document, the term "computer program product" is used to generally refer to removable storage units 2114 and 2122, a hard disk installed in hard disk drive 2110, or a signal carrying software over a communication path 2127 (wireless link or cable) to communication interface 2124. A computer useable medium can include magnetic media, optical media, or other recordable media, or media that transmits a carrier wave or other signal. These computer program products are means for providing software to computer system 2101.

Computer programs (also called computer control logic) are stored in main memory 2107 and/or secondary memory 2108. Computer programs can also be received via communications interface 2124. Such computer programs, when executed, enable the computer system 2101 to perform the features of the present invention as discussed herein. In particular, the computer programs, when executed, enable the processor 2104 to perform the features of the present invention. Accordingly, such computer programs represent controllers of the computer system 2101.

The present invention can be implemented as control logic in software, firmware, hardware or any combination thereof. In an embodiment where the invention is implemented using software, the software may be stored in a computer program product and loaded into computer system 2101 using removable storage drive 2112, hard drive 2110, or interface 2120. Alternatively, the computer program product may be downloaded to computer system 2101 over communications path 2127. The control logic (software), when executed by the one or more processors 2104, causes the processor(s) 2104 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

IV. Conclusion

Although specific embodiments of the invention have been disclosed, it will be understood by those having skill in the art that changes can be made to those specific embodiments without departing from the spirit and the scope of the invention.

For example, while the encryption and security techniques of the present invention are described in the context of messaging tag, they may also be employed with short-range tag implementations involving technologies, such as Bluetooth.

What is claimed is:

1. A method comprising facilitating access to at least one interface configured to allow access to at least one service, the at least one service configured to perform at least the following:
    causing, at least in part, reception, of a request to resolve an encrypted tag identifier of a device,
    generating a decrypted identifier by decrypting the encrypted tag identifier;
    causing, at least in part, transmission of the decrypted identifier to user identifier device; and
    receiving information corresponding to a user of the device based, at least in part, on the decrypted identifier.

2. The method of claim 1, wherein the decryption is based, at least in part on an asymmetric encryption algorithm.

3. The method of claim 1, further comprising:
    causing, at least in part, transmission of the information to a proximity based wireless device associated with the request.

4. The method of claim 3, further comprising:
    determining whether the proximity based wireless device is authorized to obtain the information.

5. The method of claim 3, wherein the information is caused to be transmitted to the proximity based wireless device via a short messaging service (SMS) message.

6. The method of claim 1, wherein the information includes a username.

7. The method of claim 1, wherein the decrypted identifier includes a mobile station integrated services digital network number (MSISDN), an international mobile subscriber identity (IMSI), an e-mail address, an Internet Protocol (IP) address, or a combination thereof.

8. The method of claim 1, wherein the request is received via a short messaging service (SMS) message.

9. A method, comprising:
    generating a multimedia message;
    creating an electronic tag including an identity of a user and the multimedia message, wherein the identity is uniquely associated with the multimedia message; and
    causing, at least in part, transmission of the electronic tag for subsequent accessing of the multimedia message by one or more wireless devices.

10. The method of claim 9, wherein the unique association is based, at least in part, on prohibiting alteration of the multimedia message by the one or more wireless devices.

11. The method of claim 9, wherein the multimedia message is accessed via a virtual wall data construct.

12. The method of claim 9, wherein the generation of the multimedia message is based on either text, audio, an image, or a combination thereof.

13. The method of claim 9, wherein the electronic tag includes a field that relates to an originator of content in the multimedia message.

14. The method of claim 9, further comprising:
    maintaining a hop count value for the electronic tag to track transmission of the electronic tag.

15. The method of claim 9, wherein the one or more wireless devices include a wireless personal area network (PAN) device, a wireless local area network device, a high performance radio local area network device, or a combination thereof.

16. An apparatus comprising:
    at least one processor; and
    at least one memory including computer program code for one or more programs, the at least one memory and the computer program code configured to, with the at least one processor, cause the apparatus to perform at least the following, generate a multimedia message;

create an electronic tag including an identity of a user and the multimedia message, wherein the identity is uniquely associated with the multimedia message; and cause, at least in part, transmission of the electronic tag for subsequent accessing of the multimedia message by one or more wireless devices.

17. The apparatus of claim 16, wherein the unique association is based, at least in part, on prohibiting alteration of the multimedia message by the one or more wireless devices.

18. The apparatus of claim 16, wherein the multimedia message is accessed via a virtual wall data construct.

19. The apparatus of claim 16, wherein the generation of the multimedia message is based on either text, audio, an image, or a combination thereof.

20. The apparatus of claim 16, wherein the electronic tag includes a field that relates to an originator of content in the multimedia message.

21. The apparatus of claim 16, wherein the apparatus is further caused to:

maintain a hop count value for the electronic tag to track transmission of the electronic tag.

22. The apparatus of claim 16, wherein the one or more wireless devices include a wireless personal area network (PAN) device, a wireless local area network device, a high performance radio local area network device, or a combination thereof.

23. A method, comprising:

receiving an electronic tag from a device, the electronic tag including multimedia content and an identifier; and associating the electronic tag with a virtual wall data construct that permits access of the multimedia content of the electronic tag; and causing, at least in part, storage of the electronic tag among a plurality of electronic tags associated with the virtual wall data construct.

24. The method of claim 23, wherein the identifier is generated from a user identifier with an asymmetric encryption algorithm and a public key.

25. The method of claim 23, further comprising:

causing, at least in part, searching for a particular one of the stored electronic tags based on a corresponding identifier.

26. The method of claim 23, wherein the association is unique to the identifier to prohibit alteration of the multimedia message.

* * * * *